US012601271B2

(12) United States Patent
Yadav et al.

(10) Patent No.: US 12,601,271 B2
(45) Date of Patent: Apr. 14, 2026

(54) VARIABLE PITCH FAN OF A GAS TURBINE ENGINE

(71) Applicant: General Electric Company, Schenectady, NY (US)

(72) Inventors: Abhijeet Jayshingrao Yadav, Karad (IN); Nicholas Joseph Kray, Mason, OH (US); Nicholas M. Daggett, Camden, ME (US); Nitesh Jain, Bengaluru (IN); Matthew Mark Weaver, Loveland, OH (US); Srinivas Addagatla, Gebze (TR)

(73) Assignee: General Electric Company, Evendale, OH (US)

( * ) Notice: Subject to any disclaimer, the term of this patent is extended or adjusted under 35 U.S.C. 154(b) by 1 day.

(21) Appl. No.: 17/970,687

(22) Filed: Oct. 21, 2022

(65) Prior Publication Data

US 2024/0133301 A1 Apr. 25, 2024
US 2024/0229656 A9 Jul. 11, 2024

(51) Int. Cl.
*F01D 7/00* (2006.01)
*F04D 29/32* (2006.01)
*F04D 29/36* (2006.01)

(52) U.S. Cl.
CPC ............. *F01D 7/00* (2013.01); *F04D 29/323* (2013.01); *F04D 29/362* (2013.01); *F05D 2220/323* (2013.01); *F05D 2220/36* (2013.01); *F05D 2240/30* (2013.01); *F05D 2260/36* (2013.01); *F05D 2260/74* (2013.01); *F05D 2260/75* (2013.01); *F05D 2260/76* (2013.01); *F05D 2260/77* (2013.01); *F05D 2260/79* (2013.01)

(58) Field of Classification Search
CPC .......... F01D 7/00; F01D 7/02; F05D 2260/74; F05D 2260/75; F05D 2260/76; F05D 2260/77; F05D 2260/79; F05D 2260/36; F04D 29/323; F04D 29/362; F04D 29/363
See application file for complete search history.

(56) References Cited

U.S. PATENT DOCUMENTS

| | | | | |
|---|---|---|---|---|
| 493,623 A | | 3/1893 | Harris | |
| 1,878,358 A | * | 9/1932 | Yates | B64C 11/30 416/157 R |
| 1,894,047 A | | 1/1933 | Lilley | |
| 1,894,048 A | | 1/1933 | Lilley | |

(Continued)

FOREIGN PATENT DOCUMENTS

| | | | |
|---|---|---|---|
| CA | 2917362 | A1 | 7/1997 |
| CA | 2798211 | A1 | 6/2013 |

(Continued)

*Primary Examiner* — Christopher Verdier
(74) *Attorney, Agent, or Firm* — Dority & Manning, P.A.

(57) ABSTRACT

A gas turbine engine includes a turbomachine comprising a compressor section, a combustion section, and a turbine section arranged in serial flow order. A fan defining a fan axis and comprising a plurality of fan blades is rotatable about the fan axis. A pitch change mechanism is operable with the plurality of fan blades to control a pitch of the plurality of fan blades. A counterweight is connected to each respective fan blade. A spring mechanism is operably associated with each fan blade of the plurality of fan blades to create a spring twisting moment on the respective fan blade that is counter to a centrifugal twisting moment of the respective fan blade.

17 Claims, 7 Drawing Sheets

(56) References Cited

U.S. PATENT DOCUMENTS

| | | | | |
|---|---|---|---|---|
| 1,951,321 | A | 3/1934 | Blanchard | |
| 2,030,953 | A | 2/1936 | Gemeny | |
| 2,032,255 | A | 2/1936 | Caldwell | |
| 2,107,785 | A * | 2/1938 | Grabarse | B64C 11/06 416/135 |
| 2,160,025 | A | 5/1939 | Martin | |
| 2,177,315 | A | 10/1939 | De Caria | |
| 2,179,492 | A | 11/1939 | Caldwell et al. | |
| 2,204,639 | A | 6/1940 | Woodward | |
| 2,280,713 | A | 4/1942 | Martin et al. | |
| 2,308,488 | A | 1/1943 | Caldwell et al. | |
| 2,343,416 | A | 3/1944 | Keller | |
| 2,346,979 | A | 4/1944 | Lilley | |
| 2,353,334 | A | 7/1944 | Haugh | |
| 2,353,566 | A | 7/1944 | Keller | |
| 2,357,400 | A | 9/1944 | Haines | |
| 2,363,670 | A | 11/1944 | Hoover | |
| 2,375,429 | A | 5/1945 | Martin | |
| 2,388,276 | A | 11/1945 | McCoy | |
| 2,402,065 | A | 6/1946 | Martin | |
| 2,413,439 | A | 12/1946 | Drake | |
| 2,415,421 | A * | 2/1947 | Raymond | B64C 11/343 416/157 R |
| 2,417,406 | A | 3/1947 | Burkhalter, Jr. | |
| 2,423,400 | A | 7/1947 | Nichols | |
| 2,424,749 | A | 7/1947 | Haines | |
| 2,427,586 | A | 9/1947 | Biermann | |
| 2,433,990 | A | 1/1948 | Hardy | |
| 2,437,701 | A | 3/1948 | McCoy | |
| 2,466,775 | A | 4/1949 | Martin | |
| 2,484,603 | A | 10/1949 | Audemar et al. | |
| 2,488,686 | A | 11/1949 | Sensenich et al. | |
| 2,504,209 | A | 4/1950 | Martin et al. | |
| 2,507,671 | A | 5/1950 | May | |
| 2,515,037 | A | 7/1950 | Hardy | |
| 2,518,431 | A | 8/1950 | Wildhaber | |
| 2,527,022 | A | 10/1950 | May et al. | |
| 2,549,108 | A | 4/1951 | Martin | |
| 2,550,529 | A | 4/1951 | Carson et al. | |
| 2,566,696 | A | 9/1951 | Cushman | |
| 2,590,940 | A | 4/1952 | Collins | |
| 2,648,391 | A | 8/1953 | Cushman et al. | |
| 2,665,055 | A | 1/1954 | Adams, Jr. | |
| 2,693,242 | A * | 11/1954 | Elmer | B64C 11/346 416/139 |
| 2,955,656 | A | 10/1960 | Balje et al. | |
| 3,163,231 | A | 12/1964 | Barnes et al. | |
| 3,212,586 | A | 10/1965 | Barnes et al. | |
| 3,219,121 | A | 11/1965 | Barden | |
| 3,249,159 | A | 5/1966 | Biermann | |
| 3,363,419 | A | 1/1968 | Wilde | |
| 3,380,535 | A | 4/1968 | Biermann | |
| 3,560,110 | A | 2/1971 | Cornell | |
| 3,663,119 | A | 5/1972 | Brooking et al. | |
| 3,781,131 | A | 12/1973 | McMurtry | |
| 3,873,236 | A | 3/1975 | Gall | |
| 3,901,626 | A | 8/1975 | McMurtry | |
| 3,922,852 | A | 12/1975 | Drabek | |
| 3,988,889 | A | 11/1976 | Chamay et al. | |
| 3,994,128 | A | 11/1976 | Griswold, Jr. et al. | |
| 4,141,664 | A | 2/1979 | Moran et al. | |
| 4,411,596 | A | 10/1983 | Chilman | |
| 4,533,295 | A | 8/1985 | Duchesneau | |
| 4,578,019 | A | 3/1986 | Safarik | |
| 4,621,978 | A | 11/1986 | Stuart | |
| 4,657,484 | A | 4/1987 | Wakeman et al. | |
| 4,671,737 | A | 6/1987 | Whitehouse | |
| 4,701,104 | A * | 10/1987 | Cohen | F01D 7/02 416/51 |
| 4,704,862 | A | 11/1987 | Dennison et al. | |
| 4,738,589 | A | 4/1988 | Wright | |
| 4,738,590 | A | 4/1988 | Butler | |
| 4,738,591 | A | 4/1988 | Butler | |
| 4,759,186 | A | 7/1988 | Sugden | |
| 4,772,181 | A | 9/1988 | Poucher | |
| 4,863,352 | A | 9/1989 | Hauser et al. | |
| 4,913,623 | A | 4/1990 | Schilling et al. | |
| 4,927,329 | A | 5/1990 | Kilman et al. | |
| 4,934,901 | A | 6/1990 | Duchesneau | |
| 4,936,746 | A | 6/1990 | Mayo et al. | |
| 4,936,748 | A | 6/1990 | Adamson et al. | |
| 4,969,325 | A | 11/1990 | Adamson et al. | |
| 4,976,102 | A | 12/1990 | Taylor | |
| 5,010,729 | A | 4/1991 | Adamson et al. | |
| 5,015,150 | A | 5/1991 | Rohra | |
| 5,152,668 | A | 10/1992 | Bulman et al. | |
| 5,154,372 | A | 10/1992 | Hora et al. | |
| 5,174,716 | A | 12/1992 | Hora et al. | |
| 5,186,608 | A | 2/1993 | Bagge | |
| 5,213,471 | A | 5/1993 | Miller et al. | |
| 5,242,265 | A | 9/1993 | Hora et al. | |
| 5,257,907 | A | 11/1993 | Seidel | |
| 5,263,898 | A | 11/1993 | Elston, III et al. | |
| 5,284,418 | A | 2/1994 | Moriya | |
| 5,394,766 | A | 3/1995 | Johnson et al. | |
| 5,431,539 | A | 7/1995 | Carvalho | |
| 5,443,229 | A | 8/1995 | O'Brien et al. | |
| 5,501,575 | A | 3/1996 | Eldredge et al. | |
| 5,529,263 | A | 6/1996 | Rudolph | |
| 5,542,357 | A | 8/1996 | Gerhardt | |
| 5,562,417 | A | 10/1996 | Grimm et al. | |
| 5,617,719 | A | 4/1997 | Ginter | |
| 5,630,701 | A | 5/1997 | Lawer | |
| 5,727,757 | A | 3/1998 | Nyhus | |
| 5,779,446 | A | 7/1998 | Althof et al. | |
| 5,810,555 | A | 9/1998 | Savage et al. | |
| 5,836,743 | A | 11/1998 | Carvalho et al. | |
| 5,897,293 | A | 4/1999 | Arel et al. | |
| 5,904,320 | A | 5/1999 | Tindell | |
| 5,931,636 | A | 8/1999 | Savage et al. | |
| 5,967,461 | A | 10/1999 | Farrington | |
| 5,974,882 | A | 11/1999 | Heath | |
| 5,977,307 | A | 11/1999 | Yamada et al. | |
| 5,977,677 | A | 11/1999 | Henry et al. | |
| 6,000,635 | A | 12/1999 | Justice | |
| 6,027,383 | A | 2/2000 | Broinowski | |
| 6,071,077 | A | 6/2000 | Rowlands | |
| 6,112,512 | A | 9/2000 | Miller et al. | |
| 6,112,513 | A | 9/2000 | Catt et al. | |
| 6,112,523 | A | 9/2000 | Kamo et al. | |
| 6,148,605 | A | 11/2000 | Lardellier | |
| 6,158,894 | A | 12/2000 | Pujari et al. | |
| 6,173,908 | B1 | 1/2001 | Bureaux et al. | |
| 6,195,981 | B1 | 3/2001 | Hanley et al. | |
| 6,196,801 | B1 | 3/2001 | Muhlbauer | |
| 6,226,974 | B1 | 5/2001 | Andrew et al. | |
| 6,247,311 | B1 | 6/2001 | Itoyama et al. | |
| 6,260,794 | B1 | 7/2001 | Rowe | |
| 6,270,309 | B1 | 8/2001 | Ghetzler et al. | |
| 6,276,127 | B1 | 8/2001 | Alberti | |
| 6,289,666 | B1 | 9/2001 | Ginter | |
| 6,292,763 | B1 | 9/2001 | Dunbar et al. | |
| 6,308,740 | B1 | 10/2001 | Smith et al. | |
| 6,314,721 | B1 | 11/2001 | Mathews et al. | |
| 6,322,341 | B1 | 11/2001 | Haas | |
| 6,324,828 | B1 | 12/2001 | Willis et al. | |
| 6,332,313 | B1 | 12/2001 | Willis et al. | |
| 6,332,754 | B1 | 12/2001 | Matsuda et al. | |
| 6,349,682 | B1 | 2/2002 | Alexius et al. | |
| 6,386,830 | B1 | 5/2002 | Slipper et al. | |
| 6,416,015 | B1 | 7/2002 | Carson | |
| 6,439,840 | B1 | 8/2002 | Tse | |
| 6,450,369 | B1 | 9/2002 | Heyes | |
| 6,464,459 | B2 | 10/2002 | Illingworth | |
| 6,499,286 | B1 | 12/2002 | Zakharov et al. | |
| 6,516,603 | B1 | 2/2003 | Urbach et al. | |
| 6,520,286 | B1 | 2/2003 | Frederiksen et al. | |
| 6,543,998 | B1 | 4/2003 | Scharl | |
| 6,557,503 | B2 | 5/2003 | Hampson | |
| 6,557,799 | B1 | 5/2003 | Sternberger | |
| 6,564,556 | B2 | 5/2003 | Ginter | |
| 6,565,334 | B1 | 5/2003 | Bradbury et al. | |
| 6,647,708 | B2 | 11/2003 | Bornhoft et al. | |
| 6,651,439 | B2 | 11/2003 | Al-Roub et al. | |

(56) References Cited

U.S. PATENT DOCUMENTS

| | | | |
|---|---|---|---|
| 6,687,596 | B2 | 2/2004 | Humerickhouse et al. |
| 6,691,515 | B2 | 2/2004 | Verdouw et al. |
| 6,708,905 | B2 | 3/2004 | Borissov et al. |
| 6,722,847 | B2 | 4/2004 | Freeman et al. |
| 6,749,395 | B1 | 6/2004 | Reichert et al. |
| 6,802,185 | B2 | 10/2004 | Furukawa et al. |
| 6,820,431 | B2 | 11/2004 | McManus et al. |
| 6,866,610 | B2 | 3/2005 | Ito |
| 6,885,129 | B1 | 4/2005 | Oohashi et al. |
| 6,885,917 | B2 | 4/2005 | Osder et al. |
| 6,942,453 | B2 | 9/2005 | Tsuru et al. |
| 6,942,458 | B2 | 9/2005 | McCallum et al. |
| 6,964,170 | B2 | 11/2005 | Alkabie |
| 6,969,235 | B2 | 11/2005 | Feest |
| 6,981,365 | B1 | 1/2006 | Johnson |
| 7,007,483 | B2 | 3/2006 | Peters |
| 7,043,900 | B2 | 5/2006 | Shirakawa et al. |
| 7,048,206 | B2 | 5/2006 | Walti et al. |
| 7,055,329 | B2 | 6/2006 | Martens et al. |
| 7,083,773 | B2 | 8/2006 | Kwon et al. |
| 7,100,868 | B2 | 9/2006 | Stephan |
| RE39,479 | E | 1/2007 | Tressler et al. |
| 7,189,059 | B2 | 3/2007 | Barton et al. |
| 7,204,676 | B2 | 4/2007 | Dutton et al. |
| 7,252,478 | B2 | 8/2007 | Aynsley |
| 7,293,401 | B2 | 11/2007 | Papamoschou |
| 7,306,434 | B2 | 12/2007 | Goldfinch |
| 7,308,966 | B2 | 12/2007 | Gupta |
| 7,310,951 | B2 | 12/2007 | Kasahara |
| 7,318,619 | B2 | 1/2008 | Munro et al. |
| 7,320,748 | B2 | 1/2008 | Hemighaus et al. |
| 7,341,225 | B2 | 3/2008 | Stretton et al. |
| 7,406,826 | B2 | 8/2008 | Hayashi et al. |
| 7,424,413 | B2 | 9/2008 | Brooke et al. |
| 7,503,750 | B1 | 3/2009 | Violette |
| 7,520,124 | B2 | 4/2009 | Narayanan et al. |
| 7,543,452 | B2 | 6/2009 | Reba et al. |
| 7,549,293 | B2 | 6/2009 | Gallagher et al. |
| 7,600,371 | B2 | 10/2009 | Sternberger |
| 7,608,181 | B2 | 10/2009 | O'Rear |
| 7,624,567 | B2 | 12/2009 | Peters |
| 7,625,128 | B2 | 12/2009 | Gillespie |
| 7,631,484 | B2 | 12/2009 | Giffin et al. |
| 7,637,669 | B2 | 12/2009 | Glueck |
| 7,637,716 | B2 | 12/2009 | Benton |
| 7,681,398 | B2 | 3/2010 | Patel et al. |
| 7,735,601 | B1 | 6/2010 | Stieger et al. |
| 7,748,950 | B2 | 7/2010 | Kodama et al. |
| 7,753,036 | B2 | 7/2010 | Lents et al. |
| 7,801,669 | B2 | 9/2010 | Nagae |
| 7,863,767 | B2 | 1/2011 | Chapple et al. |
| 7,878,130 | B2 | 2/2011 | Yamamoto et al. |
| 7,901,657 | B2 | 3/2011 | Arpac et al. |
| 7,918,090 | B2 | 4/2011 | Suzuki et al. |
| 7,918,608 | B2 | 4/2011 | Braun |
| 7,918,646 | B2 | 4/2011 | Akcasu |
| 7,934,368 | B2 | 5/2011 | Muller et al. |
| 7,963,364 | B2 | 6/2011 | Nadler et al. |
| 7,980,810 | B2 | 7/2011 | Unno |
| 8,051,830 | B2 | 11/2011 | Taylor |
| 8,074,440 | B2 | 12/2011 | Kohlenberg et al. |
| 8,074,924 | B2 | 12/2011 | Cros |
| 8,075,270 | B2 | 12/2011 | Violette et al. |
| 8,087,251 | B2 | 1/2012 | Iwasaki et al. |
| 8,087,870 | B2 | 1/2012 | Flucker et al. |
| 8,089,173 | B2 | 1/2012 | Freda |
| 8,092,150 | B2 | 1/2012 | Rofka et al. |
| 8,100,665 | B2 | 1/2012 | DeFilippis et al. |
| 8,100,671 | B2 | 1/2012 | Botros et al. |
| 8,122,724 | B2 | 2/2012 | Slovisky et al. |
| RE43,252 | E | 3/2012 | Ginter |
| 8,133,027 | B2 | 3/2012 | Carvalho et al. |
| 8,205,827 | B2 | 6/2012 | Kerrebrock et al. |
| 8,220,443 | B2 | 7/2012 | Murata et al. |
| 8,225,593 | B2 | 7/2012 | LeHong et al. |
| 8,261,527 | B1 | 9/2012 | Stearns et al. |
| 8,262,358 | B1 | 9/2012 | Muylaert et al. |
| 8,276,360 | B2 | 10/2012 | Poisson et al. |
| 8,308,423 | B2 | 11/2012 | Berryann et al. |
| 8,308,426 | B2 | 11/2012 | Cigal et al. |
| 8,336,290 | B2 | 12/2012 | Glynn et al. |
| 8,365,513 | B2 | 2/2013 | McVey |
| 8,365,515 | B2 | 2/2013 | Migliaro, Jr. |
| 8,366,382 | B1 | 2/2013 | Muldoon et al. |
| 8,366,385 | B2 | 2/2013 | Davis et al. |
| 8,376,696 | B2 | 2/2013 | Suzuki et al. |
| 8,382,430 | B2 | 2/2013 | Parry et al. |
| 8,387,570 | B2 | 3/2013 | Firey |
| 8,413,418 | B2 | 4/2013 | Mason et al. |
| 8,418,436 | B2 | 4/2013 | Pero et al. |
| 8,418,964 | B2 | 4/2013 | LeBlanc et al. |
| 8,439,637 | B2 | 5/2013 | DiBenedetto et al. |
| 8,443,586 | B2 | 5/2013 | Schwark, Jr. et al. |
| 8,448,451 | B2 | 5/2013 | Nakamura et al. |
| 8,453,458 | B2 | 6/2013 | Whurr et al. |
| 8,460,779 | B2 | 6/2013 | Gupta et al. |
| 8,499,626 | B2 | 8/2013 | Greciet et al. |
| 8,517,665 | B2 | 8/2013 | Lugo et al. |
| 8,529,192 | B2 | 9/2013 | Beers et al. |
| 8,544,793 | B1 | 10/2013 | Shammoh |
| 8,562,284 | B2 | 10/2013 | Bradbrook |
| 8,568,101 | B2 | 10/2013 | Fujimura |
| 8,572,943 | B1 | 11/2013 | Sheridan |
| 8,601,786 | B2 | 12/2013 | Hurwitz et al. |
| 8,606,543 | B2 | 12/2013 | Naslund et al. |
| 8,622,697 | B2 | 1/2014 | Bortoli et al. |
| 8,646,721 | B2 | 2/2014 | Chapman et al. |
| 8,668,463 | B2 | 3/2014 | Yilmaz |
| 8,702,381 | B2 | 4/2014 | Alajbegovic et al. |
| 8,708,256 | B2 | 4/2014 | Kobayashi |
| 8,708,640 | B2 | 4/2014 | Power |
| 8,713,910 | B2 | 5/2014 | Stuart et al. |
| 8,726,787 | B2 | 5/2014 | Glynn et al. |
| 8,747,054 | B2 | 6/2014 | Witlicki |
| 8,757,975 | B2 | 6/2014 | Swift et al. |
| 8,777,793 | B2 | 7/2014 | Sheridan |
| 8,793,971 | B2 | 8/2014 | Dyer et al. |
| 8,794,542 | B1 | 8/2014 | Hunter et al. |
| 8,794,846 | B2 | 8/2014 | Hashish |
| 8,794,910 | B2 | 8/2014 | Gasmen et al. |
| 8,806,850 | B2 | 8/2014 | Winter et al. |
| 8,807,921 | B2 | 8/2014 | Struziak |
| 8,814,502 | B2 | 8/2014 | Eleftheriou |
| 8,814,510 | B2 | 8/2014 | Colson et al. |
| 8,820,090 | B2 | 9/2014 | Lee et al. |
| 8,820,091 | B2 | 9/2014 | Tham et al. |
| 8,827,203 | B2 | 9/2014 | Balk |
| 8,827,639 | B2 | 9/2014 | Beers et al. |
| 8,834,028 | B2 | 9/2014 | Winkler et al. |
| 8,834,095 | B2 | 9/2014 | Davis |
| 8,834,099 | B1 | 9/2014 | Topol et al. |
| 8,834,119 | B2 | 9/2014 | Balk et al. |
| 8,840,375 | B2 | 9/2014 | Virkler |
| 8,851,754 | B2 | 10/2014 | Dettmar et al. |
| 8,857,149 | B1 | 10/2014 | Muldoon |
| 8,857,193 | B2 | 10/2014 | Thies |
| 8,863,529 | B2 | 10/2014 | Starr |
| 8,985,954 | B2 | 3/2015 | Balk et al. |
| 9,090,336 | B2 | 7/2015 | Gallet |
| 9,328,737 | B2 | 5/2016 | Bouru et al. |
| 9,481,449 | B2 | 11/2016 | Pascal |
| 9,869,190 | B2 | 1/2018 | Niergarth et al. |
| 10,072,510 | B2 | 9/2018 | Miller et al. |
| 10,077,674 | B2 | 9/2018 | Miller et al. |
| 10,100,653 | B2 | 10/2018 | Niergarth et al. |
| 10,279,889 | B2 | 5/2019 | Belmonte et al. |
| 10,288,083 | B2 | 5/2019 | Miller et al. |
| 10,443,412 | B2 | 10/2019 | Niergarth et al. |
| 10,486,794 | B2 | 11/2019 | Kiesewetter et al. |
| 10,533,436 | B2 | 1/2020 | Niergarth et al. |
| 10,633,987 | B2 | 4/2020 | de Wergifosse |
| 2002/0124991 | A1 | 9/2002 | Wilson |
| 2002/0162394 | A1 | 11/2002 | Loftus et al. |
| 2003/0163983 | A1 | 9/2003 | Seda et al. |

(56) References Cited

U.S. PATENT DOCUMENTS

| | | | |
|---|---|---|---|
| 2003/0163984 | A1 | 9/2003 | Seda et al. |
| 2003/0163986 | A1 | 9/2003 | McGuire |
| 2003/0215330 | A1 | 11/2003 | Haller |
| 2004/0123583 | A1 | 7/2004 | Nordeen et al. |
| 2004/0129392 | A1 | 7/2004 | Crane et al. |
| 2004/0261396 | A1 | 12/2004 | Sammann et al. |
| 2005/0068232 | A1 | 3/2005 | Smith et al. |
| 2005/0178105 | A1 | 8/2005 | Kawamoto et al. |
| 2005/0241292 | A1 | 11/2005 | Taylor et al. |
| 2006/0024162 | A1 | 2/2006 | Giffin |
| 2006/0090451 | A1 | 5/2006 | Moniz et al. |
| 2006/0096293 | A1 | 5/2006 | Norris et al. |
| 2006/0272314 | A1 | 12/2006 | Moniz et al. |
| 2006/0275111 | A1 | 12/2006 | Orlando et al. |
| 2007/0084186 | A1 | 4/2007 | Orlando et al. |
| 2007/0130959 | A1 | 6/2007 | Linet et al. |
| 2007/0157595 | A1 | 7/2007 | Lockwood |
| 2007/0212220 | A1 | 9/2007 | Perkinson et al. |
| 2007/0212221 | A1 | 9/2007 | Carvalho et al. |
| 2008/0022691 | A1 | 1/2008 | Kennepohl et al. |
| 2008/0056894 | A1 | 3/2008 | Tsifourdaris et al. |
| 2008/0089630 | A1 | 4/2008 | Glueck |
| 2008/0098713 | A1 | 5/2008 | Orlando et al. |
| 2008/0118360 | A1 | 5/2008 | Findlay et al. |
| 2008/0124221 | A1 | 5/2008 | Kidikian et al. |
| 2008/0138195 | A1 | 6/2008 | Kern et al. |
| 2008/0140352 | A1 | 6/2008 | Goebel et al. |
| 2008/0143108 | A1 | 6/2008 | El-Refaie et al. |
| 2008/0149445 | A1 | 6/2008 | Kern et al. |
| 2008/0155961 | A1 | 7/2008 | Johnson |
| 2008/0253881 | A1 | 10/2008 | Richards |
| 2008/0273969 | A1 | 11/2008 | Murrow et al. |
| 2008/0283676 | A1 | 11/2008 | Jain et al. |
| 2009/0016870 | A1 | 1/2009 | Kodama et al. |
| 2009/0068003 | A1 | 3/2009 | Sharma et al. |
| 2009/0112535 | A1 | 4/2009 | Phillips |
| 2009/0133381 | A1 | 5/2009 | Holmes et al. |
| 2009/0199536 | A1 | 8/2009 | Bulin et al. |
| 2009/0211221 | A1 | 8/2009 | Roberge |
| 2009/0257878 | A1 | 10/2009 | Hernandez et al. |
| 2009/0314082 | A1 | 12/2009 | Sujan et al. |
| 2010/0000222 | A1 | 1/2010 | Price et al. |
| 2010/0014976 | A1 | 1/2010 | Arel et al. |
| 2010/0019101 | A1 | 1/2010 | Smith et al. |
| 2010/0034659 | A1 | 2/2010 | Fujimura |
| 2010/0047068 | A1 | 2/2010 | Parry et al. |
| 2010/0058769 | A1 | 3/2010 | Baran |
| 2010/0061856 | A1 | 3/2010 | DeMania et al. |
| 2010/0061860 | A1 | 3/2010 | Riaz et al. |
| 2010/0061861 | A1 | 3/2010 | Riaz et al. |
| 2010/0089019 | A1 | 4/2010 | Knight et al. |
| 2010/0092295 | A1 | 4/2010 | Riaz et al. |
| 2010/0154761 | A1 | 6/2010 | Okumura et al. |
| 2010/0192595 | A1 | 8/2010 | Orlando et al. |
| 2010/0193644 | A1 | 8/2010 | Karem |
| 2010/0280730 | A1 | 11/2010 | Page et al. |
| 2010/0300087 | A1 | 12/2010 | Liu et al. |
| 2010/0305011 | A1 | 12/2010 | Frapin et al. |
| 2010/0326753 | A1 | 12/2010 | Garside |
| 2011/0004388 | A1 | 1/2011 | Winter |
| 2011/0036086 | A1 | 2/2011 | Liu et al. |
| 2011/0052370 | A1 | 3/2011 | Karpman et al. |
| 2011/0061381 | A1 | 3/2011 | Harris et al. |
| 2011/0076158 | A1 | 3/2011 | Giffin et al. |
| 2011/0083641 | A1 | 4/2011 | Gokhale et al. |
| 2011/0092726 | A1 | 4/2011 | Clarke |
| 2011/0118071 | A1 | 5/2011 | Maziere |
| 2011/0120082 | A1 | 5/2011 | Giffin et al. |
| 2011/0167784 | A1 | 7/2011 | Johnson et al. |
| 2011/0167792 | A1 | 7/2011 | Johnson et al. |
| 2011/0167831 | A1 | 7/2011 | Johnson |
| 2011/0189003 | A1 | 8/2011 | Iida |
| 2011/0243719 | A1 | 10/2011 | Murphy et al. |
| 2011/0268578 | A1 | 11/2011 | Praisner et al. |
| 2011/0277448 | A1 | 11/2011 | Roberts |
| 2011/0286842 | A1 | 11/2011 | Danielson et al. |
| 2011/0288744 | A1 | 11/2011 | Gokhale et al. |
| 2011/0290483 | A1 | 12/2011 | Zornes |
| 2012/0011825 | A1 | 1/2012 | Hall et al. |
| 2012/0036843 | A1 | 2/2012 | Schertz et al. |
| 2012/0045334 | A1 | 2/2012 | Bouru et al. |
| 2012/0056034 | A1 | 3/2012 | Kosheleff |
| 2012/0073263 | A1 | 3/2012 | Kohlenberg et al. |
| 2012/0085861 | A1 | 4/2012 | Mardjono et al. |
| 2012/0087780 | A1 | 4/2012 | Suciu et al. |
| 2012/0096823 | A1 | 4/2012 | Taylor |
| 2012/0097801 | A1 | 4/2012 | Barrett |
| 2012/0110979 | A1 | 5/2012 | Rosenkrans et al. |
| 2012/0117940 | A1 | 5/2012 | Winter |
| 2012/0117975 | A1 | 5/2012 | Sharma et al. |
| 2012/0121390 | A1 | 5/2012 | Suciu et al. |
| 2012/0152007 | A1 | 6/2012 | Holmes et al. |
| 2012/0171018 | A1 | 7/2012 | Hasel et al. |
| 2012/0174593 | A1 | 7/2012 | Sharma et al. |
| 2012/0198815 | A1 | 8/2012 | Suciu et al. |
| 2012/0198816 | A1 | 8/2012 | Suciu et al. |
| 2012/0198817 | A1 | 8/2012 | Suciu et al. |
| 2012/0210710 | A1 | 8/2012 | Chevalier et al. |
| 2012/0210711 | A1 | 8/2012 | Petrovic et al. |
| 2012/0222397 | A1 | 9/2012 | Smith et al. |
| 2012/0222398 | A1 | 9/2012 | Smith et al. |
| 2012/0237334 | A1 | 9/2012 | McCune et al. |
| 2012/0238401 | A1 | 9/2012 | McCune et al. |
| 2012/0251306 | A1 | 10/2012 | Reinhardt et al. |
| 2012/0255292 | A1 | 10/2012 | Fong et al. |
| 2012/0257960 | A1 | 10/2012 | Reinhardt et al. |
| 2012/0275904 | A1 | 11/2012 | McCune et al. |
| 2012/0279198 | A1 | 11/2012 | Erickson et al. |
| 2012/0291449 | A1 | 11/2012 | Adams et al. |
| 2012/0292440 | A1 | 11/2012 | Kosheleff |
| 2012/0321476 | A1 | 12/2012 | Mackie et al. |
| 2012/0328436 | A1 | 12/2012 | Soidel et al. |
| 2013/0000314 | A1 | 1/2013 | McCaffrey |
| 2013/0004297 | A1 | 1/2013 | Sheridan |
| 2013/0008144 | A1 | 1/2013 | Gallagher et al. |
| 2013/0008146 | A1 | 1/2013 | Gallagher et al. |
| 2013/0011261 | A1 | 1/2013 | Boston et al. |
| 2013/0014490 | A1 | 1/2013 | Suciu et al. |
| 2013/0028733 | A1 | 1/2013 | McCune |
| 2013/0067917 | A1 | 3/2013 | Nagurney et al. |
| 2013/0068200 | A1 | 3/2013 | Reynolds et al. |
| 2013/0074492 | A1 | 3/2013 | Chi et al. |
| 2013/0074512 | A1 | 3/2013 | Tillery |
| 2013/0081374 | A1 | 4/2013 | Giffin et al. |
| 2013/0091852 | A1 | 4/2013 | Wood et al. |
| 2013/0094937 | A1 | 4/2013 | Glahn et al. |
| 2013/0094943 | A1 | 4/2013 | Bouru et al. |
| 2013/0096786 | A1 | 4/2013 | Jang |
| 2013/0098046 | A1 | 4/2013 | Suciu et al. |
| 2013/0098050 | A1 | 4/2013 | Kupratis |
| 2013/0098055 | A1 | 4/2013 | Kupratis |
| 2013/0104560 | A1 | 5/2013 | Kupratis |
| 2013/0125561 | A1 | 5/2013 | Schwarz et al. |
| 2013/0139519 | A1 | 6/2013 | Kesseli et al. |
| 2013/0145745 | A1 | 6/2013 | Kohlenberg et al. |
| 2013/0149099 | A1 | 6/2013 | Kohlenberg et al. |
| 2013/0149111 | A1 | 6/2013 | Kohlenberg et al. |
| 2013/0149112 | A1 | 6/2013 | Kohlenberg et al. |
| 2013/0163905 | A1 | 6/2013 | Vintinner et al. |
| 2013/0186060 | A1 | 7/2013 | Kosheleff |
| 2013/0186191 | A1 | 7/2013 | Djelassi |
| 2013/0189117 | A1 | 7/2013 | Baltas et al. |
| 2013/0192199 | A1 | 8/2013 | Merry et al. |
| 2013/0192200 | A1 | 8/2013 | Kupratis et al. |
| 2013/0192201 | A1 | 8/2013 | Kupratis et al. |
| 2013/0192232 | A1 | 8/2013 | Clemen |
| 2013/0192238 | A1 | 8/2013 | Munsell et al. |
| 2013/0192239 | A1 | 8/2013 | Glahn et al. |
| 2013/0192240 | A1 | 8/2013 | Munsell et al. |
| 2013/0192241 | A1 | 8/2013 | Blackwell et al. |
| 2013/0192242 | A1 | 8/2013 | Davis et al. |
| 2013/0192247 | A1 | 8/2013 | Blackwell et al. |
| 2013/0192248 | A1 | 8/2013 | Ackermann et al. |
| 2013/0192250 | A1 | 8/2013 | Glahn et al. |

(56) References Cited

U.S. PATENT DOCUMENTS

| | | | |
|---|---|---|---|
| 2013/0192251 | A1 | 8/2013 | Munsell et al. |
| 2013/0192252 | A1 | 8/2013 | Ackermann et al. |
| 2013/0192253 | A1 | 8/2013 | Ackermann et al. |
| 2013/0192256 | A1 | 8/2013 | Suciu et al. |
| 2013/0192258 | A1 | 8/2013 | Kupratis et al. |
| 2013/0192260 | A1 | 8/2013 | Mayer et al. |
| 2013/0192261 | A1 | 8/2013 | Mayer et al. |
| 2013/0192262 | A1 | 8/2013 | Eastwood et al. |
| 2013/0192266 | A1 | 8/2013 | Houston et al. |
| 2013/0192519 | A1 | 8/2013 | Kim et al. |
| 2013/0195624 | A1 | 8/2013 | Schwarz et al. |
| 2013/0195641 | A1 | 8/2013 | Povey |
| 2013/0195645 | A1 | 8/2013 | Suciu et al. |
| 2013/0195647 | A1 | 8/2013 | Muldoon et al. |
| 2013/0199179 | A1 | 8/2013 | Kitsukawa et al. |
| 2013/0209291 | A1 | 8/2013 | Kitsukawa et al. |
| 2013/0216364 | A1 | 8/2013 | Evans |
| 2013/0219856 | A1 | 8/2013 | Suciu et al. |
| 2013/0219859 | A1 | 8/2013 | Suciu et al. |
| 2013/0219860 | A1 | 8/2013 | Suciu et al. |
| 2013/0219895 | A1 | 8/2013 | Joshi et al. |
| 2013/0219908 | A1 | 8/2013 | Schwarz et al. |
| 2013/0219922 | A1 | 8/2013 | Gilson et al. |
| 2013/0220288 | A1 | 8/2013 | Klingbell |
| 2013/0223973 | A1 | 8/2013 | Ali |
| 2013/0223992 | A1 | 8/2013 | Suciu et al. |
| 2013/0223993 | A1 | 8/2013 | Merry et al. |
| 2013/0233970 | A1 | 9/2013 | Cottet |
| 2013/0236296 | A1 | 9/2013 | Colloopy et al. |
| 2013/0255275 | A1 | 10/2013 | Schwarz et al. |
| 2013/0259651 | A1 | 10/2013 | Kupratis et al. |
| 2013/0259653 | A1 | 10/2013 | Schwarz et al. |
| 2013/0263592 | A1 | 10/2013 | Lotterman et al. |
| 2013/0269311 | A1 | 10/2013 | Wichmann et al. |
| 2013/0269479 | A1 | 10/2013 | van der Merwe et al. |
| 2013/0276424 | A1 | 10/2013 | Topol et al. |
| 2013/0277443 | A1 | 10/2013 | Croll et al. |
| 2013/0280031 | A1 | 10/2013 | Hurlin et al. |
| 2013/0283821 | A1 | 10/2013 | Gilson et al. |
| 2013/0287581 | A1 | 10/2013 | Aschermann et al. |
| 2013/0298522 | A1 | 11/2013 | Eleftheriou et al. |
| 2013/0305714 | A1 | 11/2013 | Rollinger et al. |
| 2013/0305731 | A1 | 11/2013 | Morris et al. |
| 2013/0318939 | A1 | 12/2013 | Parnin et al. |
| 2013/0318988 | A1 | 12/2013 | Robinson |
| 2013/0318998 | A1 | 12/2013 | Schwarz et al. |
| 2013/0319010 | A1 | 12/2013 | Hui et al. |
| 2013/0321824 | A1 | 12/2013 | Hockaday |
| 2013/0323012 | A1 | 12/2013 | Dong et al. |
| 2013/0323072 | A1 | 12/2013 | Aschermann et al. |
| 2013/0334824 | A1 | 12/2013 | Freda |
| 2013/0340406 | A1 | 12/2013 | Gallagher et al. |
| 2013/0343876 | A1 | 12/2013 | LeBlanc et al. |
| 2013/0343896 | A1 | 12/2013 | Mackie et al. |
| 2014/0000269 | A1 | 1/2014 | Idahosa et al. |
| 2014/0003915 | A1 | 1/2014 | Topol et al. |
| 2014/0007585 | A1 | 1/2014 | Liu |
| 2014/0030087 | A1 | 1/2014 | Soria et al. |
| 2014/0044540 | A1 | 2/2014 | Uneura |
| 2014/0061392 | A1 | 3/2014 | Karem |
| 2014/0083107 | A1 | 3/2014 | Sheridan et al. |
| 2014/0083115 | A1 | 3/2014 | Von Nieda |
| 2014/0093350 | A1 | 4/2014 | Meisner et al. |
| 2014/0096508 | A1 | 4/2014 | McCune et al. |
| 2014/0096509 | A1 | 4/2014 | Hasel |
| 2014/0096534 | A1 | 4/2014 | Snape et al. |
| 2014/0109571 | A1 | 4/2014 | Primus et al. |
| 2014/0112774 | A1 | 4/2014 | Freeman et al. |
| 2014/0112784 | A1 | 4/2014 | Pascal |
| 2014/0125121 | A1 | 5/2014 | Edwards et al. |
| 2014/0130503 | A1 | 5/2014 | Leep |
| 2014/0148928 | A1 | 5/2014 | Stewart |
| 2014/0154064 | A1 | 6/2014 | Bouteiller et al. |
| 2014/0154076 | A1 | 6/2014 | Belmonte et al. |
| 2014/0157752 | A1 | 6/2014 | Hasel et al. |
| 2014/0157753 | A1 | 6/2014 | Hasel et al. |
| 2014/0157754 | A1 | 6/2014 | Hasel et al. |
| 2014/0157755 | A1 | 6/2014 | Hasel et al. |
| 2014/0157756 | A1 | 6/2014 | Hasel et al. |
| 2014/0157757 | A1 | 6/2014 | Hasel et al. |
| 2014/0165534 | A1 | 6/2014 | Hasel et al. |
| 2014/0174056 | A1 | 6/2014 | Suciu et al. |
| 2014/0182309 | A1 | 7/2014 | Ali |
| 2014/0186158 | A1 | 7/2014 | Merry et al. |
| 2014/0190163 | A1 | 7/2014 | Maier |
| 2014/0193238 | A1 | 7/2014 | Sheridan et al. |
| 2014/0193253 | A1 | 7/2014 | Carvalho |
| 2014/0196472 | A1 | 7/2014 | Kupratis et al. |
| 2014/0196473 | A1 | 7/2014 | Kupratis et al. |
| 2014/0202133 | A1 | 7/2014 | Praisner et al. |
| 2014/0205438 | A1 | 7/2014 | Hasel |
| 2014/0205457 | A1 | 7/2014 | Curlier et al. |
| 2014/0216003 | A1 | 8/2014 | Phillips et al. |
| 2014/0219783 | A1 | 8/2014 | Coffin et al. |
| 2014/0234078 | A1 | 8/2014 | Sheridan et al. |
| 2014/0234089 | A1 | 8/2014 | Moradell-Casellas et al. |
| 2014/0245749 | A1 | 9/2014 | Mercier et al. |
| 2014/0248116 | A1 | 9/2014 | Ali |
| 2014/0248129 | A1 | 9/2014 | Merry et al. |
| 2014/0260326 | A1 | 9/2014 | Schwarz et al. |
| 2014/0263712 | A1 | 9/2014 | Froemming et al. |
| 2014/0270605 | A1 | 9/2014 | Rosen et al. |
| 2014/0271112 | A1 | 9/2014 | Morin et al. |
| 2014/0271135 | A1 | 9/2014 | Sheridan et al. |
| 2014/0277991 | A1 | 9/2014 | Skertic et al. |
| 2014/0283500 | A1 | 9/2014 | Sabnis |
| 2014/0290211 | A1 | 10/2014 | Kupratis et al. |
| 2014/0301837 | A1 | 10/2014 | Dezeustre et al. |
| 2014/0308123 | A1 | 10/2014 | Nussenblatt et al. |
| 2014/0314541 | A1 | 10/2014 | Schwarz et al. |
| 2014/0326826 | A1 | 11/2014 | Certain |
| 2015/0337901 | A1 | 11/2015 | Hayashi et al. |
| 2016/0169117 | A1 | 6/2016 | Scipio et al. |
| 2016/0186657 | A1 | 6/2016 | Van Der Merwe et al. |
| 2016/0290228 | A1 | 10/2016 | van der Merwe et al. |
| 2017/0101877 | A1 * | 4/2017 | Niergarth ................ F01D 5/323 |
| 2020/0283137 | A1 | 9/2020 | Mehta |
| 2020/0298959 | A1 | 9/2020 | Castellani et al. |

FOREIGN PATENT DOCUMENTS

| | | | |
|---|---|---|---|
| CN | 102483038 | A | 5/2012 |
| CN | 103119250 | A | 5/2013 |
| EP | 0992696 | A1 | 4/2000 |
| EP | 1254831 | A1 | 11/2002 |
| EP | 2009246 | A1 | 12/2008 |
| EP | 2607231 | A2 | 6/2013 |
| FR | 2964942 | A1 | 3/2012 |
| FR | 3005095 | A1 | 10/2014 |
| GB | 1418905 | A | 12/1975 |
| GB | 2218747 | A | 11/1989 |
| GB | 2226087 | A | 6/1990 |
| JP | H02179598 | A | 7/1990 |
| JP | H05149328 | A | 6/1993 |
| JP | H05149329 | A | 6/1993 |
| JP | H05164132 | A | 6/1993 |
| JP | 2007192315 | A | 8/2007 |
| JP | 2009115139 | A | 5/2009 |
| JP | 2010001992 | A | 1/2010 |
| JP | 2013256397 | A | 12/2013 |
| JP | 2014088893 | A | 5/2014 |
| JP | 2014173635 | A | 9/2014 |
| JP | 2015059645 | A | 3/2015 |
| WO | WO2009109355 | A1 | 9/2009 |

* cited by examiner

VARIABLE PITCH FAN OF A GAS TURBINE ENGINE

FIELD

The present disclosure is related to a variable pitch fan of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. Gas turbine engines typically include a fan assembly that provides air to a core engine and compresses the air to generate thrust. At least some known fan assemblies include variable pitch fan blades that are controlled by externally modulated flows of hydraulic fluid. Fan blade pitch controls the performance of the fan, so it may be optimized at various aircraft conditions. In some known fan assemblies, counterweights are employed to bias the propeller blades to high pitch or feathered condition in the event of a hydraulic system failure. The counterweights produce a twisting moment on the propeller blades when the propeller blades are rotating such that the twisting moment on the propeller blades bias the blades to the high pitch or feathered condition.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

DETAILED DESCRIPTION

Figure 1:
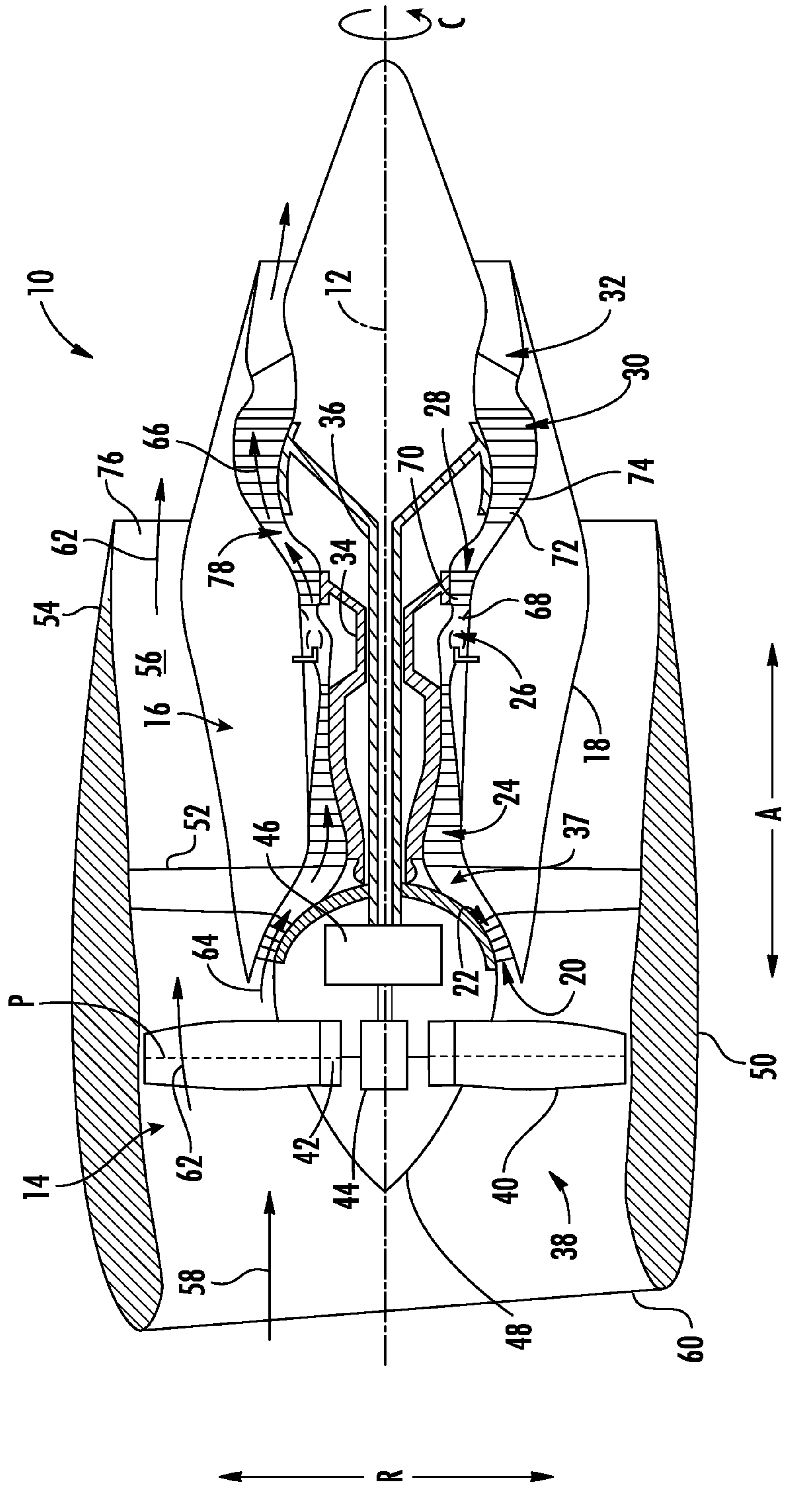
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first" and "second" may be used interchangeably to distinguish one component from another and are not intended to signify location or importance of the individual components.

The present disclosure is generally related to a spring mechanism for a variable pitch fan assembly of a gas turbine engine and a gas turbine engine including the same. In at least certain exemplary embodiments, a pitch change mechanism operable with the plurality of fan blades is capable of varying the pitch of individual fan blades, and the spring mechanism of the present disclosure produces a spring twisting moment on the propeller blades such that the spring twisting moment on the propeller blades by the spring mechanism counters a centrifugal twisting moment of the fan blade resulting from the rotation of the fan blade (e.g., applying a torque to the fan blades in a direction to bias the fan blade toward the high pitch or feathered condition). Thus, embodiments of the present disclosure enable a reduction in weight of the counterweights, or an elimination of the counterweights, as well as improve the effectiveness of the counterweights for low fan speeds. Further, embodiments of the present disclosure function as a stopper system configured to ensure that the fan blades are in a feathered (open) position in the event of a failure of a pitch control mechanism or actuator.

Referring now to the drawings, wherein identical numerals indicate the same elements throughout the Figures, FIG. 1 is a schematic cross-sectional view of a gas turbine engine 10 in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal axis 12 provided for reference), a radial direction R, and a circumferential direction C extending about the longitudinal axis 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gearbox 46, and the fan blades 40, disk 42, and pitch change mechanism 44 are together rotatable about the longitudinal axis 12 by LP shaft 36 across the power gearbox 46. The power gearbox 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by a rotatable front hub 48 of the fan section 14 (sometimes also referred to as a "spinner"), the front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56 and a second portion of air 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gearbox 46) and a variable pitch gas turbine engine (i.e., including the fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
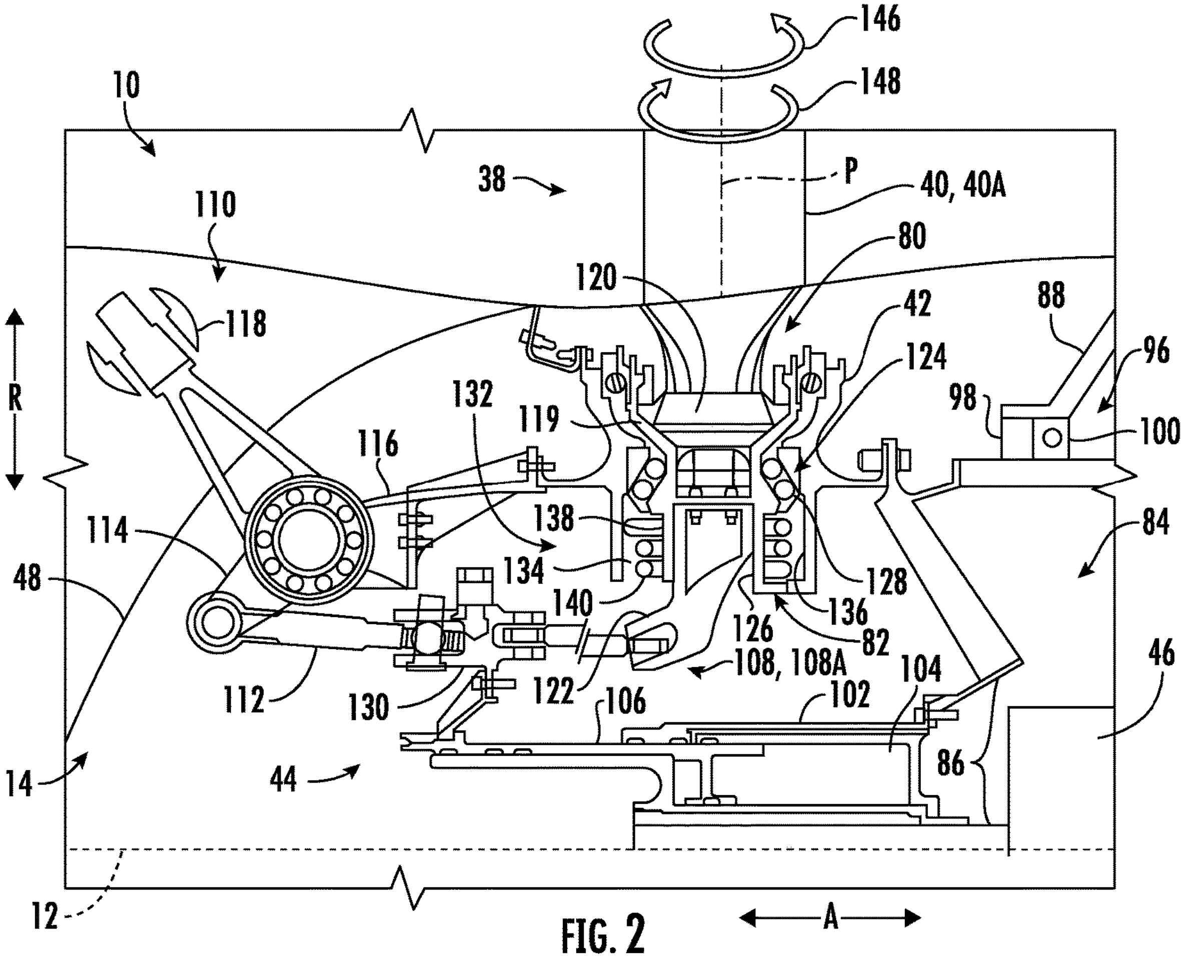
FIG. 2 is a side view of a forward end of the exemplary gas turbine engine of FIG. 1 depicting an exemplary embodiment of a spring mechanism for a variable pitch fan of a gas turbine engine according to an exemplary aspect the present disclosure.

Referring now to FIG. 2, a schematic, cross-sectional view of a forward end of the gas turbine engine 10 of FIG. 1 in accordance with an exemplary embodiment of the present disclosure is provided. Specifically, FIG. 2 provides a schematic, cross-sectional view of the fan section 14 of the gas turbine engine 10.

As depicted in FIG. 2, the fan section 14 (also referred to herein as a "fan assembly") generally includes a fan 38 configured as a variable pitch fan having a plurality of fan blades 40 coupled to a disk 42. Briefly, it will be appreciated that the fan 38 is configured as a forward thrust fan configured to generate thrust for the gas turbine engine 10 (and, e.g., an aircraft incorporating the gas turbine engine 10) in a forward direction. The "forward direction" may correspond to a forward direction of an aircraft incorporating the gas turbine engine 10, and in the embodiment depicted is a direction pointing to the left.

Referring still to FIG. 2, each fan blade 40 includes a base 80 at an inner end along a radial direction R. Each fan blade 40 is coupled at the base 80 to the disk 42 via a respective trunnion 82. The trunnion 82 facilitates rotation of a respective fan blade 40 about a pitch axis P of the respective fan blades 40. The base 80 may be attached to the trunnion 82 in any suitable manner. For example, the base 80 may be attached to the trunnion 82 using a pinned connection, or any other suitable connection. In still other exemplary embodiments, the base 80 may be formed integrally with the trunnion 82.

Further, as with the exemplary gas turbine engine 10 of FIG. 1, the fan 38 of the exemplary gas turbine engine 10 depicted in FIG. 2 is mechanically coupled to a turbomachine 16 (not depicted, see FIG. 1). More particularly, the exemplary fan 38 of the gas turbine engine 10 of FIG. 2 is rotatable about a longitudinal axis 12 of the gas turbine engine 10 by an LP shaft 36 (not depicted, see FIG. 1) across a power gearbox 46. Specifically, the disk 42 is attached to the power gearbox 46 through a fan rotor 84, which includes one or more individual structural members 86 for the embodiment depicted. The power gearbox 46 is, in turn, attached to the LP shaft 36 (not depicted, see FIG. 1), such that rotation of the LP shaft correspondingly rotates the fan rotor 84 and the plurality of fan blades 40. Notably, as is also depicted, the fan section 14 additionally includes a front hub 48 (which is rotatable with, e.g., the disk 42 and plurality of fan blades 40).

Moreover, the fan 38 additionally includes a stationary fan frame 88 and one or more fan bearings 96 for supporting rotation of the various rotating components of the fan 38, such as the plurality of fan blades 40. More particularly, the fan frame 88 supports the various rotating components of the fan 38 through the one or more fan bearings 96. For the embodiment depicted, the one or more fan bearings 96 includes a forward roller bearing 98 and an aft ball bearing 100. However, in other exemplary embodiments, any other suitable number and/or type of bearings may be provided for supporting rotation of the plurality of fan blades 40. For example, in other exemplary embodiments, the one or more fan bearings 96 may include a pair (two) of tapered roller bearings, or any other suitable bearings.

Additionally, the exemplary fan 38 of the gas turbine engine 10 includes a pitch change mechanism 44 for rotating each of the plurality of fan blades 40 about their respective pitch axes P.

In particular, for the exemplary embodiment depicted, the pitch change mechanism 44 includes a master control 102 configured to rotate with the plurality of fan blades 40 of the fan 38. In the embodiment depicted, the master control 102 is coupled to the fan rotor 84, such that the master control 102 is rotatable with the fan rotor 84 and the plurality of fan blades 40 of the fan 38. The master control 102 includes a cylinder 104 and an arm 106. As will be appreciated, the arm 106 may be a substantially annular arm extending in the circumferential direction C substantially completely around the longitudinal axis 12 of the gas turbine engine 10. Briefly, it will be appreciated that the longitudinal axis 12 is aligned with a fan axis for the embodiment depicted, and the terms may be used interchangeably with respect to the embodiment depicted.

The cylinder 104 is configured to move the arm 106 along the axial direction A of the gas turbine engine 10. In such a manner, it will be appreciated that the cylinder 104 may be configured as a linear actuator. In at least certain exemplary aspects, the cylinder 104 may be a pneumatic cylinder, a hydraulic cylinder, or an electrically actuated cylinder. Additionally, or alternatively, the master control 102 may include any other suitable configuration for moving the arm 106 along the axial direction A.

Further for the embodiment depicted, the pitch change mechanism 44 includes a plurality of linkages 108 coupled to the plurality of fan blades 40 (e.g., each linkage 108 of the plurality of linkages 108 coupled to a respective fan blade 40 of the plurality of fan blades 40). In particular, for the embodiment depicted, the plurality of linkages 108 are further coupled to the master control 102, such that each linkage 108 of the plurality of linkages 108 may extend from the master control 102 to the respective fan blade 40 of the plurality of fan blades 40. For example, in the embodiment of FIG. 2, the fan blade 40 depicted may be a first fan blade 40A, and the linkage 108 depicted may be a first linkage 108A of the plurality of linkages 108. The first linkage 108A is coupled to the master control 102 unit and extends to, and is coupled to, the first fan blade 40A. Each of the plurality of fan blades 40 and each of the respective plurality of linkages 108 may be arranged along the circumferential direction C and may be configured in a similar manner as exemplary first linkage 108A and first fan blade 40A depicted in FIG. 2.

In such a manner, it will be appreciated that the master control 102 may be configured to engage each linkage 108 of the plurality of linkages 108 simultaneously to change a pitch of each fan blade 40 of the plurality of fan blades 40 simultaneously and, e.g., in unison.

In the exemplary embodiment depicted, the exemplary fan 38 of the gas turbine engine 10 includes counterweight assemblies 110 (with each counterweight assembly 110 including a link arm 112, a lever arm 114, a hinge 116, and a counterweight 118). A downstream direction is shown as left-to-right.

As shown in FIG. 2, each trunnion 82 includes a generally tubular shape with a lip or collar on an end of trunnion 82 closest to disk 42. In this example, each trunnion 82 is coupled to one of fan blades 40 such that each fan blade 40 is rotatable relative to disk 42 about the respective pitch axis P of each fan blade 40. Each trunnion 82 is disposed to drive rotation of one of fan blades 40.

Each counterweight assembly 110 is operably coupled to one of trunnions 82 (e.g., via linkages 108). In this example, counterweight assemblies 110 are evenly distributed along a circumferential direction of disk 42 with a number of counterweight assemblies 110 matching the number of trunnions 82. Counterweight assemblies 110 are configured to drive a rotation of trunnions 82 in response to centrifugal force experienced by counterweights 118.

Link arms 112 and lever arms 114 are, for the embodiment shown, elongated pieces of solid material. In one example, link arms 112 and lever arms 114 can include rods. Link arm 112 is configured to couple with trunnion 82 via linkages 108. Each link arm 112 is connected to and extends between one of linkages 108 and one of lever arms 114. Link arms 112 transfer motion and torque from lever arms 114 to trunnions 82 via linkages 108. In this way, link arm 112 is configured to drive rotation of trunnion 82 relative to disk 42.

Each lever arm 114 is connected to and extends between one of link arms 112 and one of counterweights 118. A connection point of lever arm 114 to hinge 116 includes a pivot (or pivot point). In one example, lever arms 114 can be pivotably or rotatably connected to link arms 112. Put another way, lever arm 114 and hinge 116 define a pivoted connection point. In another example, lever arms 114 can be fixedly connected to or joined with link arms 112. Lever arms 114 are disposed to transfer movement/motion (e.g., angular motion/rotation) of counterweights 118 to link arms 112.

In this example, hinges 116 are pieces of solid material configured to enable rotation of another component about a pivot point of hinges 116. Each hinge 116 is pivotably connected to one of lever arms 114. For example, each one of lever arms 114 is disposed to rotate about the connection point of one of lever arms 114 and one of hinges 116. A connection point of lever arm 114 to hinge 116 includes a pivot. Hinges 116 provide a pivot about which lever arms 114 rotate in order to transfer rotation from lever arms 114 to link arms 112.

Counterweights 118 are weights or piece of solid material with mass. In this example, a shape of counterweights 118 includes a disk. In other examples, the shape of counterweights 118 can include a spheroid, an ellipsoid, an angular portion of a flat ring, a parallelogram, or another geometric shape. Each counterweight 118 is mounted to an end of one of lever arms 114 on an end opposite from hinge 116. Each counterweight 118 is mounted to one of lever arms 114 at a location spaced from one of the hinges 116. Each of counterweights 118 are configured to move in response to a change in centrifugal load applied to counterweight 118 during operation of variable pitch fan 38. For example, during certain operational (e.g., failure) modes of gas turbine engine 10, fan blades 40 of variable pitch fan 38 will rotate in response to a natural centrifugal twist moment. Such rotation can lead fan blades 40 to rotate into an undesirable high drag (e.g., fine) position. In response to centrifugal forces experienced by counterweights 118, counterweights 118 transmit the torque they generate to trunnions 82 (via lever arms 114, hinges 116, link arms 112, and linkages 108) to overcome this centrifugal twist moment and rotate fan blades 40 to a low drag or feathered (e.g., coarse) position. A mass, a density, and a shape of counterweights 118 can be tuned and/or tailored based upon desired performance characteristic of counterweight assemblies 110. In this example, a single counterweight assembly 110 per fan blade 40 acts to minimize combined failure modes.

Counterweight assemblies 110 introduce sufficient torque to each blade trunnion axis to overcome the centrifugal twist moment and rotate each of fan blades 40 to a low drag or a feathered (e.g., coarse) position.

FIG. 2 shows the pitch axis P, the fan blade 40, the disk 42, the trunnion 82 (with a body 120 and a cylindrical sleeve 126), the counterweight assembly 110, including the hinge 116 and the counterweight 118, and a bearing assembly 124 (with ball bearings 128). Bearing assembly 124 is a group of components for enabling relative rotation between two or more components. Bearing assembly 124 is disposed in and mounted to disk 42. As counterweight assembly 110 drives rotation of trunnion 82, bearing assembly 124 enables relative rotation between disk 42 and sleeve 126.

Sleeve 126 is a generally tubular or frustoconical structure of solid material. Sleeve 126 is mounted in an opening of disk 42. Sleeve 126 provides a structural interface between trunnion 82 and fan blade 40. Ball bearings 128 are rolling element bearings. Ball bearings 128 are disposed between sleeve 126 and disk 42. Ball bearings 128 spin or rotate relative to sleeve 126 and disk 42 to enable rotation of fan blade 40 and trunnion 82 relative to disk 42.

Body 120 is a tube of solid material. Body 120 is mechanically coupled to fan blade 40 and is mounted to an arm 122. Body 120 receives torque from arm 122 and transfers the torque to fan blade 40. Arm 122 is an extension of solid material extending along a radial direction outward from body 120. Arm 122 is connected to and extends between body 120 and linkages 108. Arm 122 receives a force from linkages 108 and transfers that force to body 120.

Arm 122 may include a clevis or other type of structural element to enable a pivotal coupling thereof to the linkages 108 (e.g., via a pin or otherwise).

In the illustrated exemplary embodiment of FIG. 2, linkages 108 include a ring 130. Ring 130 is a solid material having a plurality of linkage points for coupling to link arm 112, arm 106 of master control 102, and arm 122 of trunnion 82. Ring 130 is rotatable or pivotable about a radial axis parallel with the pitch axis P in order to transfer movement from link arm 112 to arm 122 of the trunnion 82 and to transfer movement of the arm 106 of the master control 102 to the arm 122 of the trunnion 82.

In the illustrated embodiment, the gas turbine engine 10 includes a spring mechanism 132 on, linked to, and/or otherwise associated with each trunnion 82 to introduce a torque to each blade trunnion axis to counter a centrifugal twisting moment of each fan blade 40 and bias or drive the fan blade 40 to a low drag or a feathered (e.g., coarse) position. In the illustrated embodiment, the spring mechanism 132 is used in combination with the counterweight assembly 110 to bias or drive the fan blade 40 to a low drag or a feathered (e.g., coarse) position. As will be appreciated, in some embodiments, spring mechanism 132 may be configured such that counterweight assemblies 110 may be omitted (e.g., the spring mechanism 132 providing a sufficient level of torque to counter the centrifugal twisting moment of the fan blade 40). In at least some embodiments, spring mechanism 132 enables a reduction in the mass of the counterweights 118 and/or an elimination of an auxiliary oil pressure system (not shown) for countering the centrifugal twisting moment of the fan blades 40.

Figure 3:
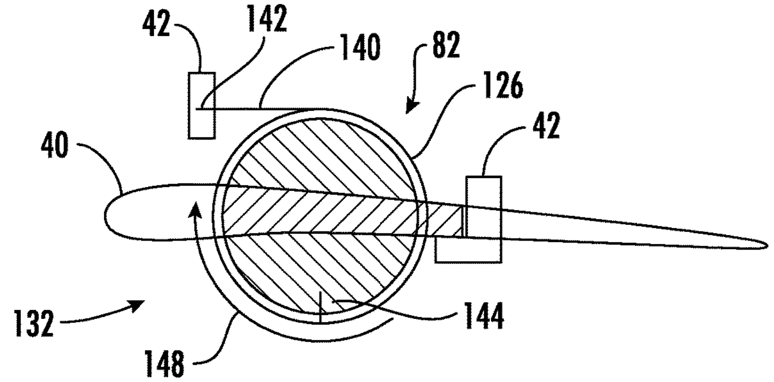
FIG. 3 is a schematic view of a portion of the spring mechanism of FIG. 2 in accordance with an exemplary aspect of the present disclosure, as viewed along a radial axis of a turbofan blade of a gas turbine engine.

In the illustrated embodiment, the spring mechanism 132 includes an annular gap 134 defined between an inner wall 136 of the disk 42 (e.g., facing inward toward the fan blade 40) and an outer wall 138 of the sleeve 126 of the trunnion 82 (e.g., facing outward away from the fan blade 40) extending circumferentially about the trunnion 82. Within the annular gap 134 is a torsion spring 140. Referring also to FIG. 3, FIG. 3 is a schematic view of a portion of the spring mechanism 132 of FIG. 2 in accordance with an exemplary aspect of the present disclosure, as viewed along a radial axis R of the turbofan blade 40 of the gas turbine engine 10. In FIGS. 2 and 3, the spring 140 has a first end 142 coupled to the disk 42 and a second end 144 coupled to the trunnion 82. The spring 140 is wrapped or spiraled about the sleeve 126 within the annular gap 134. The coupling of spring 140 to the trunnion 82 and the disk 42 results in the spring 140 providing a spring twisting moment to the trunnion 82 (i.e., a torsional moment or torque applied to the trunnion 82 that would cause a rotation of the trunnion 82 about the pitch axis P) that is counter to the centrifugal twisting moment of the fan blade 40. In some embodiments, spring 140 is configured as a non-linear spring and/or provides a non-linear spring twisting moment (e.g., a non-linear stiffness) to the trunnion 82. For example, in some embodiments, spring 140 is configured to provide a relatively linear relationship of an amount of torque applied to the trunnion 82 relative to an amount of deflection of the spring 140 through certain flight conditions (e.g., through take-off) where the torque-to-deflection relationship of the spring 140 becomes non-linear for other flight conditions (e.g., beyond take-off). The non-linear stiffness of the spring 140 may be accomplished by varying the pitch diameter of the spring 140 along its length. It will be appreciated that other methods may be used to create a non-linear torque-to-deflection relationship for the spring 140. Spring 140 may be made from materials such as aluminum, titanium, steel, or from super-elastic materials such as shape memory alloys.

In operation, a centrifugal twisting moment 146 of the fan blade 40 resulting from rotation of the fan blade 40 (i.e., a centrifugal force acting on the fan blade 40 that tends to twist the fan blade 40 about the pitch axis P) attempts to drive the pitch of the fan blade 40 to a low or fine pitch condition. Attempted rotation of the trunnion 82 resulting from the centrifugal twisting moment 146 of the fan blade 40 is countered or resisted by a spring twisting moment 148 (i.e., a torsional moment or torque applied to the trunnion 82 that would cause a rotation of the trunnion 82 about the pitch axis P) provided by the spring 140 that is in a direction opposite that of the centrifugal twisting moment 146 of the fan blade 40. Accordingly, in this embodiment, each trunnion 82 would have a spring 140 coupled to it and the disk 42 to counter the centrifugal twisting moment 146 of the respective fan blade 40.

Figure 4:
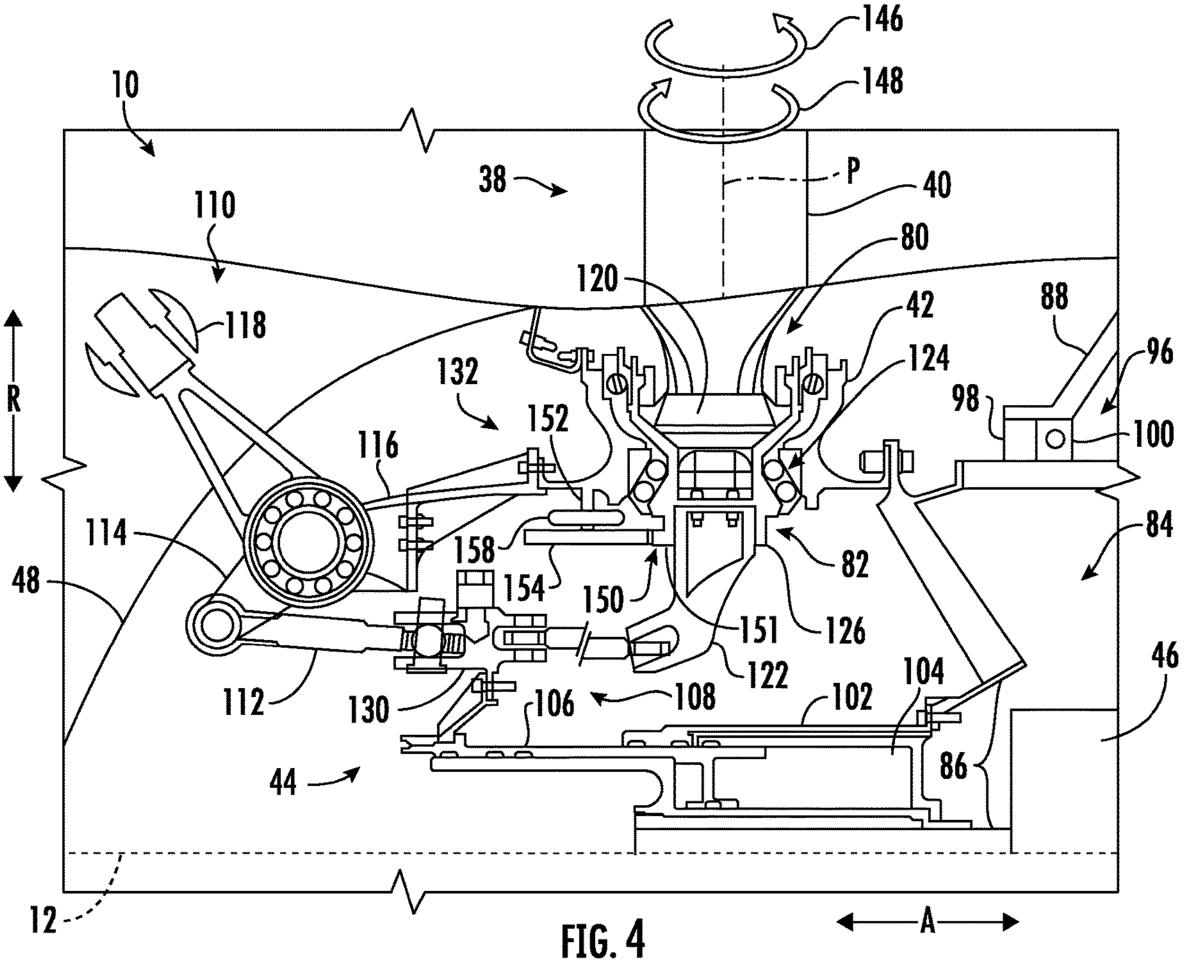
FIG. 4 is a side view of a forward end of an exemplary gas turbine engine depicting another exemplary embodiment of a spring mechanism for a variable pitch fan of a gas turbine engine according to an exemplary aspect the present disclosure.
Figure 5A:
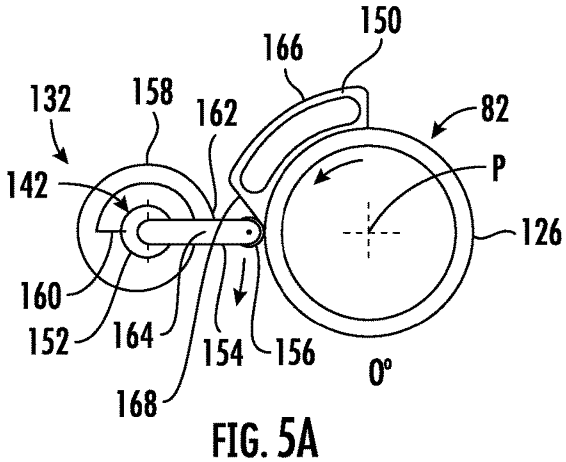
FIGS. 5A, 5B, and 5C are each schematic views of a portion of the spring mechanism of FIG. 4 in accordance with an exemplary aspect of the present disclosure, as viewed along a radial axis of a turbofan blade of a gas turbine engine.
Figure 5B:
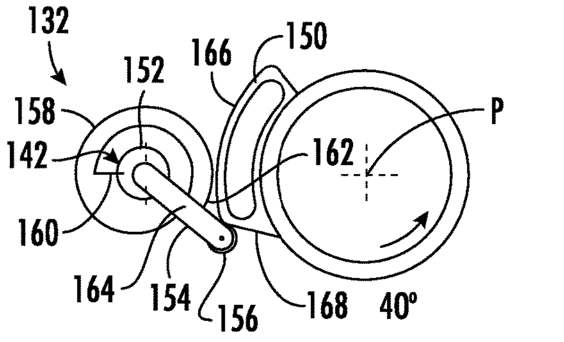
Figure 5C:
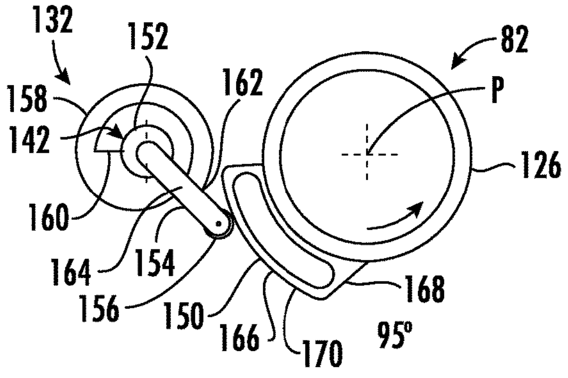

Referring now to FIGS. 4 and 5A-5C, FIG. 4 is a side view of a forward end of an exemplary gas turbine engine 10 depicting another exemplary embodiment of a spring mechanism 132 for a variable pitch fan 38 according to an exemplary aspect the present disclosure, and FIGS. 5A-5C are each schematic views of a portion of the spring mechanism of FIG. 4 in accordance with an exemplary aspect of the present disclosure, as viewed along the radial axis R of a turbofan blade 40 of the gas turbine engine 10. Gas turbine engine 10 may generally be configured in a similar manner as the gas turbine engine 10 of FIGS. 2 and 3. In such a manner, it will be appreciated that the fan 38 includes a pitch change mechanism 44 and a trunnion 82 having a bearing assembly 124 to enable rotation of fan blade 40 and trunnion 82 relative to disk 42.

In the illustrated embodiment, spring mechanism 132 includes a cam portion 150 extending outwardly from the cylindrical sleeve 126 of the trunnion 82 about a circumferential portion of the sleeve 126. For example, in this embodiment, cam portion 150 extends radially outward relative to pitch axis P of the fan blade 40 and extends partially about a circumference of the sleeve 126. The cam portion 150 is located at a radially inward end 151 of the sleeve 126 relative to the radial direction R. In the illustrated embodiment, the cam portion 150 extends about twenty-five percent (25%) of the circumference of the sleeve 126. However, it should be appreciated that the circumferential length of the cam portion 150 may vary.

In the illustrated embodiment, disk 42 includes an arm 152 having a follower 154 pivotally attached thereto. Follower 154 extends from arm 152 toward the trunnion 82 such that a distal end 156 of the follower 154 is engageable with the cam portion 150 of the trunnion 82. A torsion spring 158 is coupled to the arm 152 of the disk 42 and the follower 154. For example, in the illustrated embodiment, a first end 160 of the spring 158 is coupled to the arm 152 of the disk 42 and a second end 162 of the spring 158 is coupled toward a medial location 164 of the follower 154. Spring 158 is wrapped or spiraled about the arm 152 of the disk 42 to bias the follower 154 toward or into engagement with the cam portion 150 of the trunnion 82.

Referring more specifically to FIGS. 5A-5C, cam portion 150 has a lobe 166 extending outwardly a defined distance away from the pitch axis P. Lobe 166 has a leading edge 168 having a defined slope. The coupling of spring 158 to the follower 154 and the disk 42 results in the spring 158 creating a spring twisting moment 148 (FIG. 4) on the trunnion 82 (e.g., based on the engagement of the follower 154 with the cam portion 150 of the trunnion 82) that is counter or opposite in direction to a centrifugal twisting moment 146 (FIG. 4) of the fan blade 40 (FIG. 4). In the illustrated embodiment, the configuration of the cam portion 150 provides a non-linear torque-to-deflection relationship for the spring mechanism 132. For example, when the fan blade 40 and trunnion 82 are in the feathered or zero-degree (0°) condition, the follower 154 is located at the base of the leading edge 168 of the lobe 166 of the cam portion 150 of the trunnion 82. In the illustrated embodiment, between the feathered rotational position and a take-off rotational position of the fan blade 40 (e.g., a forty-degree (40°) fan blade 40 pitch), the follower 154 follows the leading edge 168 of the lobe 166, thereby resulting in a linear torque-to-deflection relationship of the spring 158 relative to the trunnion 82 as the follower 154 rotates about the arm 152 of the disk due to its following of the cam portion 150 (e.g., pivotal movement of the follower 154 based on its engagement with the cam portion 150 causing a torque to be applied to the trunnion 82 based on the deflection of the spring 158). However, as the trunnion 82 further rotates to change the pitch of the fan blade 40 to a finer pitch (e.g., a ninety-five-degree (95°) pitch), the follower 154 reaches an upper edge 170 of the lobe 166 and follows the upper edge 170 of the lobe 166, thereby resulting in a decrease of torque applied to the trunnion 82 by the follower 154.

Referring now to FIGS. 4 and 6A-6C, FIGS. 6A-6C are each schematic views of a portion of a spring mechanism 132 in accordance with another exemplary aspect of the present disclosure, as viewed along the radial axis R of a turbofan blade 40 of the gas turbine engine 10.

Figure 6A:
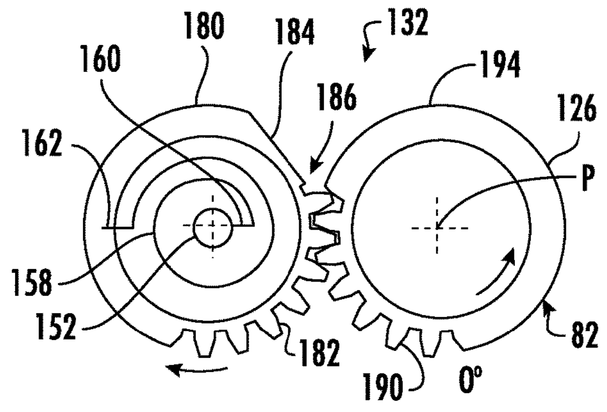
FIGS. 6A, 6B, and 6C are each schematic views of a portion of a spring mechanism in accordance with another exemplary aspect of the present disclosure, as viewed along a radial axis of a turbofan blade of a gas turbine engine.
Figure 6B:
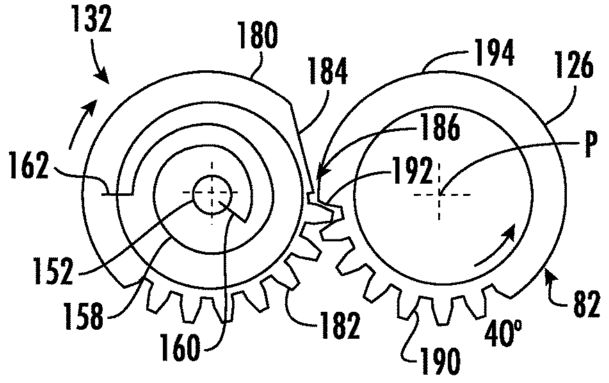
Figure 6C:
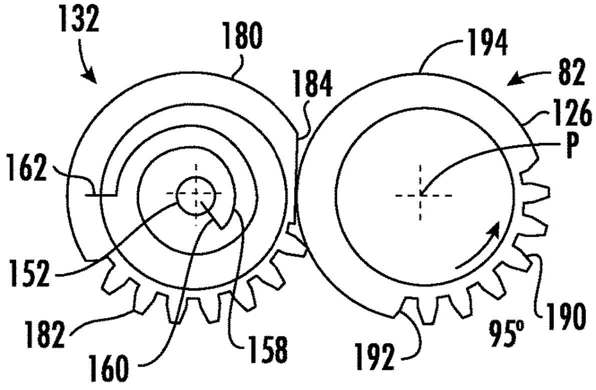

In FIG. 6A-6C, spring mechanism 132 includes a gear 180 rotatably mounted to the arm 152 of the disk 42. Gear 180 includes a set of teeth 182 extending partially about a circumference thereof and a planar portion 184 (e.g., a flat, non-toothed surface) residing near one end 186 of the teeth 182. The planar portion 184 is positioned or located on the gear 180 to engage and/or contact the trunnion 82 at a defined rotational position of the gear 180 and the trunnion 82 (i.e., a particular fan blade 40 pitch). The spring 158 is coupled to the arm 152 of the disk 42 and the gear 180. For example, in the illustrated embodiment, the first end 160 of the spring 158 is coupled to the arm 152 of the disk 42 and the second end 162 of the spring 158 is coupled to the gear 180. Spring 158 is wrapped or spiraled about the arm 152 of the disk 42 to thereby cause a torque to be applied to the trunnion 82 by the gear 180 via the spring 158.

In the illustrated embodiment, the sleeve 126 of the trunnion 82 includes a gear portion or a set of teeth 190 extending partially about a circumference thereof and positioned on the sleeve 126 to engage the teeth 182 of the gear 180. The set of teeth 190 is located at the radially inward end 151 (FIG. 4) of the sleeve 126 relative to the radial direction R. The coupling of the spring 158 to the gear 180 and the disk 42 results in the spring 158 providing a spring twisting moment 148 to the trunnion 82 (e.g., via engagement of the teeth 182 of the gear 180 with the teeth 190 of the trunnion 82) that is counter or opposite in direction to the centrifugal twisting moment 146 of the fan blade 40. In the illustrated embodiment, the configuration of the gear 180 provides a non-linear torque-to-deflection relationship for the spring mechanism 132. For example, when the fan blade 40 and trunnion 82 are in the feathered condition (e.g., a zero-degree (0°) condition), the teeth 182 of the gear 180 are in engagement with the teeth 190 of the trunnion 82, thereby resulting in a torque being applied to the trunnion 82 counter to the centrifugal twisting moment 146 of the fan blade 40. In the illustrated embodiment, between the feathered position and a take-off position of the fan blade 40 (e.g., a forty-degree (40°) fan blade 40 pitch), the teeth 182 of the gear 180 continue to maintain engagement with the teeth 190 of the trunnion 82 (e.g., the gear 180 being rotated by the trunnion 82 based on the engagement of the teeth 182 of the gear 180 with the teeth 190 of the trunnion 82, and the rotation of the gear 180 causing an increased level of torque being applied to the trunnion 832 by the spring 158 as the spring 158 deflects). Thus, a torque is applied to the trunnion 82 counter to the centrifugal twisting moment 146 of the fan blade 40 based on the engagement of the trunnion 82 with the gear 180, thereby resulting in a linear torque-to-deflection relationship of the spring 158 relative to the trunnion 82 as the gear 180 rotates about the arm 152 of the disk due to its engagement with the teeth 190 of the trunnion 82. However, as the trunnion 82 further rotates to change the pitch of the fan blade 40 to a finer pitch (e.g., a ninety-five-degree (95°) pitch), an end 192 of the set of teeth 190 of the trunnion 82 reaches the end 186 of the teeth 182 of the gear 180, and the continued rotation of the trunnion 82 results in a non-toothed portion 194 of the sleeve 126 of the trunnion 82 to engage the planar portion 184 of the gear 180, thereby resulting in a decrease of torque applied to the trunnion 82 by the gear 180.

Figure 7:
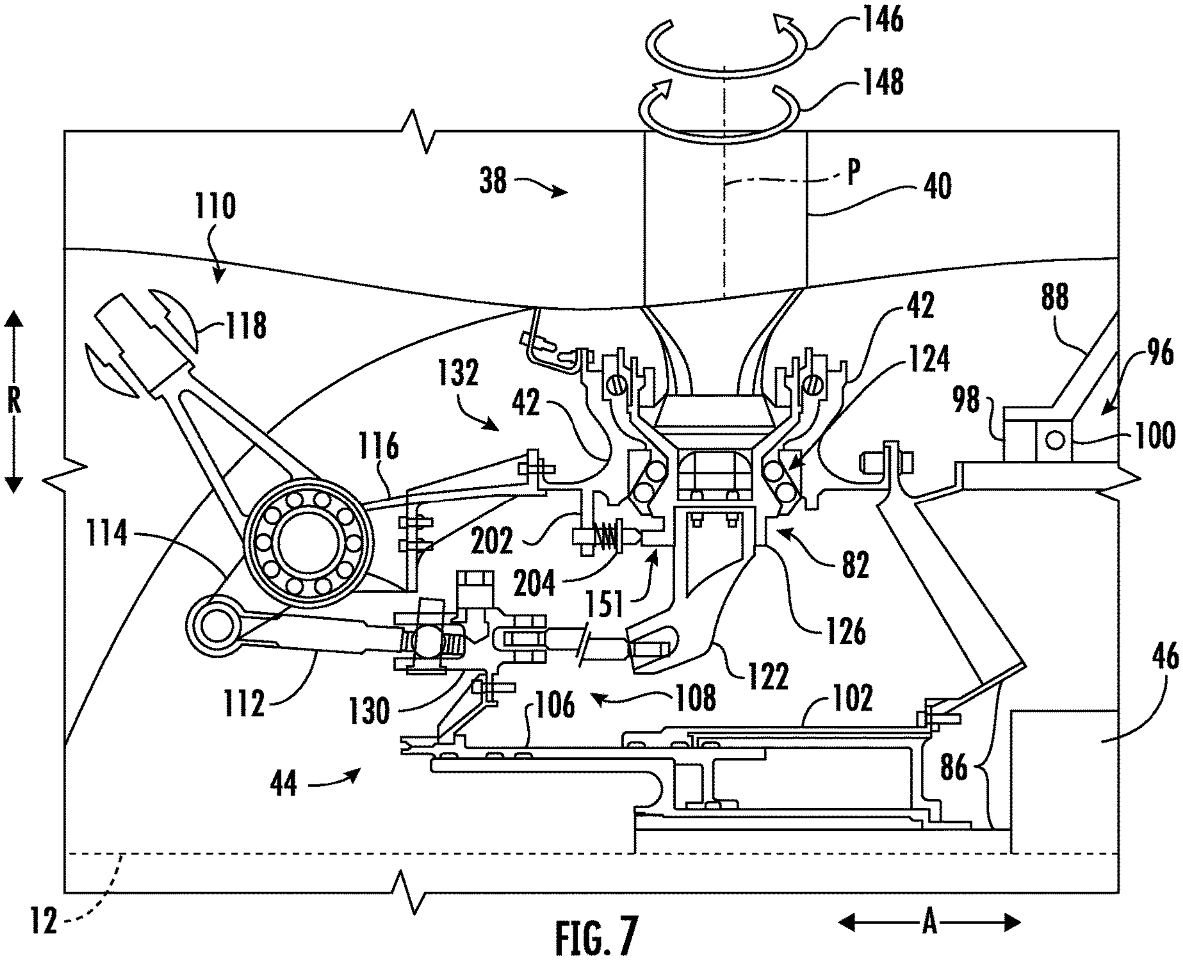
FIG. 7 is a side view of a forward end of an exemplary gas turbine engine depicting another exemplary embodiment of a spring mechanism for a variable pitch fan of a gas turbine engine according to an exemplary aspect the present disclosure.
Figure 8A:
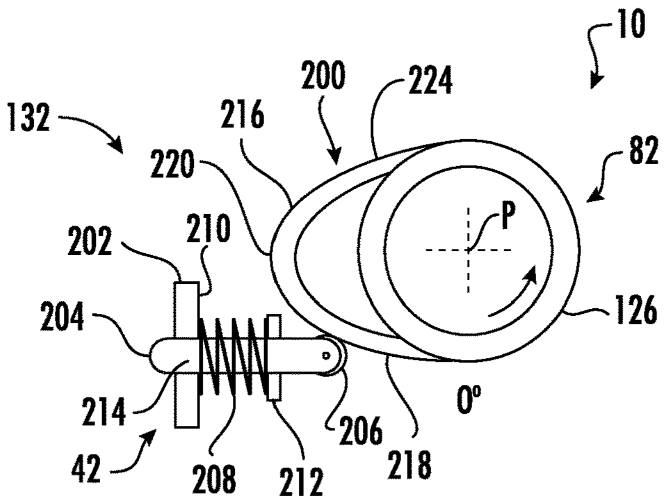
FIGS. 8A, 8B, and 8C are each schematic views of a portion of the spring mechanism of FIG. 7 in accordance with an exemplary aspect of the present disclosure, as viewed along a radial axis of a turbofan blade of a gas turbine engine.
Figure 8B:
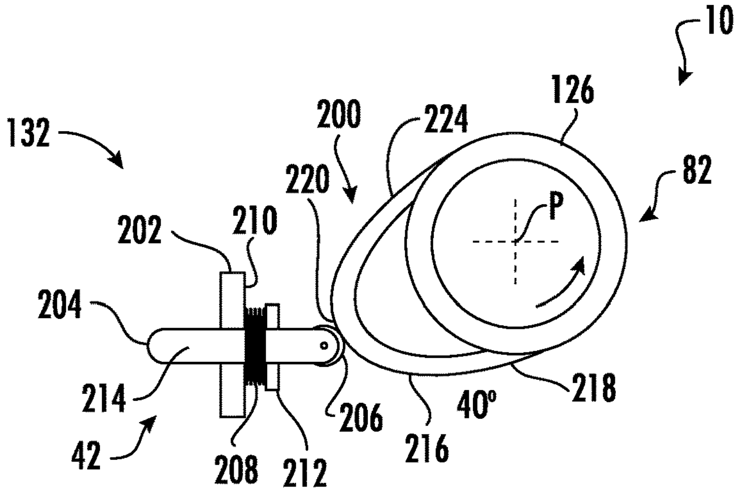
Figure 8C:
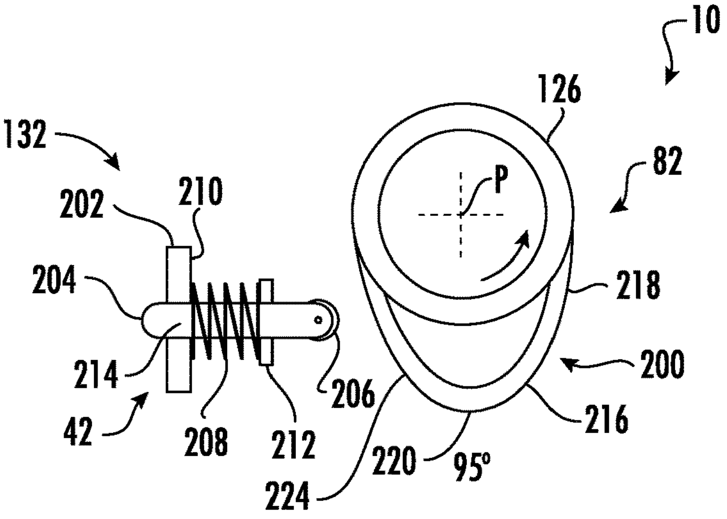

Referring now to FIGS. 7 and 8A-8C, FIG. 7 is a side view of a forward end of an exemplary gas turbine engine 10 depicting another exemplary embodiment of a spring mechanism 132 for a variable pitch fan 38 according to an exemplary aspect the present disclosure, and FIGS. 8A-8C are each schematic views of a portion of the spring mechanism 132 of FIG. 7 in accordance with an exemplary aspect of the present disclosure, as viewed along the radial axis R of a turbofan blade 40 of the gas turbine engine 10. Gas turbine engine 10 may generally be configured in a similar manner as the gas turbine engine 10 of FIGS. 2 and 3. In such a manner, it will be appreciated that the fan 38 includes a pitch change mechanism 44 and a trunnion 82 having a bearing assembly 124 to enable rotation of fan blade 40 and trunnion 82 relative to disk 42.

In the illustrated embodiment, spring mechanism 132 includes a cam portion 200 extending outwardly from the cylindrical sleeve 126 of the trunnion 82 about a circumferential portion of the sleeve 126. The cam portion 200 is located at a radially inward end 151 of the sleeve 126 relative to the radial direction R. For example, in this embodiment, cam portion 200 extends radially outward relative to the pitch axis P of the fan blade 40 and extends partially about a circumference of the sleeve 126. In the illustrated embodiment, the cam portion 200 is an ovoid or pear shape. However, it should be appreciated that the shape or geometry of the cam portion 200 may vary.

In the illustrated embodiment, disk 42 includes an arm 202 extending radially inward in the radial direction R. A biased plunger 204 is translatably coupled to the arm 202 and extends in a direction toward the trunnion 82 along an axis that is offset from the pitch axis P of the trunnion 82. The plunger 204 is positioned relative to the trunnion 82 such that a distal end 206 of the plunger 204 is engageable with the cam portion 200 of the trunnion 82. A spiral or helical spring 208 is coupled to the plunger 204 and is wrapped or spiraled about the body of the plunger 204. The spring 208 resides on the plunger 204 between a surface 210 of the arm 202 facing toward the trunnion 82 and a flange 212 of the plunger 204. The flange 212 is located between the distal end 206 of the plunger 204 and a proximal end 214 of the plunger 204 coupled to the arm 202. Thus, the spring 208 is compressible between the flange 212 and the surface

210 of the arm 202 resulting from translational movement of the plunger 204 relative to the arm 202, thereby biasing the plunger 204 toward the trunnion 82.

Referring more specifically to FIGS. 8A-8C, cam portion 200 has a lobe 216 extending radially outward a defined distance away from the pitch axis P. Lobe 216 has a leading edge 218 having a defined slope or curvature. The engagement of the distal end 206 of the plunger 204 with the cam portion 200 results in compression of the spring 208 between the flange 212 and the arm 202 of the disk 42, thereby providing a spring twisting moment 148 (FIG. 7) to the trunnion 82 that is counter or opposite in direction to the centrifugal twisting moment 148 of the fan blade 40. In the illustrated embodiment, the configuration of the cam portion 200 provides a non-linear torque-to-deflection relationship for the spring mechanism 132. For example, when the fan blade 40 and trunnion 82 are in the feathered condition (e.g., a zero-degree (0°) pitch), the plunger 204 is located along the leading edge 218 of the lobe 216 of the cam portion 200 of the trunnion 82. In the illustrated embodiment, between the feathered position and a take-off position of the fan blade 40 (e.g., a forty-degree (40°) fan blade 40 pitch), the plunger 204 follows the leading edge 218 of the lobe 216 until reaching an apex 220 of the lobe 216 (e.g., resulting in a maximum compression of the spring 208), thereby resulting in a linear torque-to-deflection relationship of the spring 208 relative to the trunnion 82 as the plunger 204 translates or moves away from the trunnion 82 due to its following of the cam portion 200. However, as the trunnion 82 further rotates to change the pitch of the fan blade 40 to a finer pitch (e.g., a ninety-five-degree (95°) pitch), the plunger 204 moves beyond the apex 220 toward a trailing edge 224 of the lobe 216, thereby resulting in the plunger 204 translating toward the trunnion 82, a decompression of the spring 208, and a decrease of torque applied to the trunnion 82 by the plunger 204.

Figure 9:
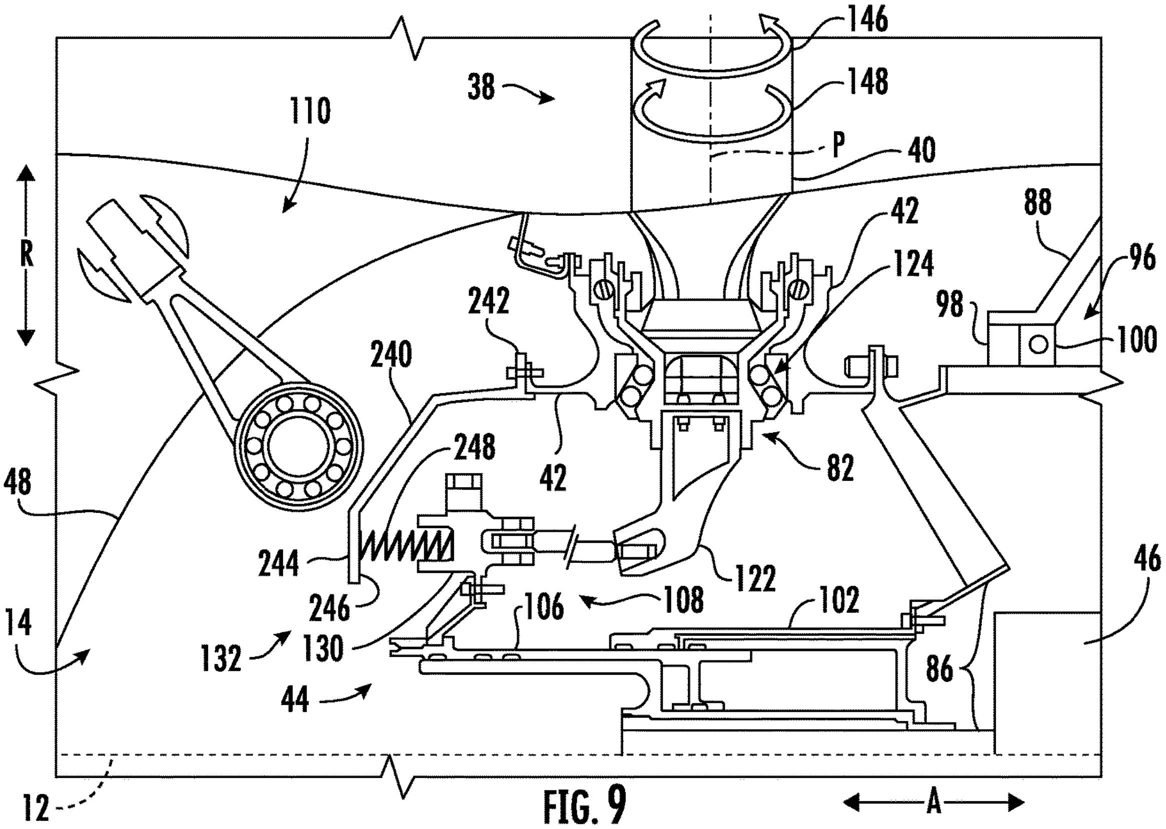
FIG. 9 is a side view of a forward end of an exemplary gas turbine engine depicting another exemplary embodiment of a spring mechanism for a variable pitch fan of a gas turbine engine according to an exemplary aspect the present disclosure.

Referring now to FIG. 9, FIG. 9 is a side view of a forward end of an exemplary gas turbine engine 10 depicting another exemplary embodiment of a spring mechanism 132 for a variable pitch fan 38 according to an exemplary aspect the present disclosure. Gas turbine engine 10 may generally be configured in a similar manner as the gas turbine engine 10 of FIGS. 2 and 3. In such a manner, it will be appreciated that the fan 38 includes a pitch change mechanism 44 and a trunnion 82 having a bearing assembly 124 to enable rotation of fan blade 40 and trunnion 82 relative to a disk 42.

In the illustrated embodiment, the spring mechanism 132 includes an arm 240 having a first end 242 thereof fixedly coupled to the disk 42 and a second end 244 thereof located proximate a ring 130. In the illustrated embodiment, the second end 244 is a freestanding end 244 having a planar surface 246 facing the ring 130. In this exemplary embodiment, the spring mechanism 132 includes a spring 248 coupled to the ring 130 and extending toward the planar surface 246 of the second end 244 of the arm 240. In FIG. 9, structure connecting the counterweight assembly 110 to the ring 130 (e.g., as depicted in FIG. 2) has been omitted from view for clarity and ease of description purposes. In the illustrated embodiment, spring 248 is a helical or spiral spring 248 being compressible between the planar surface 246 and a surface or point of contact on the ring 130. In some embodiments, spring 248 is a non-linear spring 248 providing a non-linear relationship between the force applied by the spring 248 and the deflection of the spring 248.

In the embodiment illustrated in FIG. 9, the spring 248 is coupled between the planar surface 246 of the second end 244 of the arm 240 and the ring 130 in an elongated or stretched state such that the spring 248 is pulling the ring 130 in a forward or upstream direction. As shown in FIG. 9, an upstream direction is shown as right-to-left. The force exerted by the spring 248 on the ring 130 creates a spring twisting moment 148 applied to the trunnion 82 that is counter or opposite in direction to a centrifugal twisting moment 146 of the fan blade 40. It should be appreciated that the spring 248 and/or arm 240 may be otherwise positioned relative to the ring 130 (e.g., positioned such that the spring 248 is in a compressed state against the planar surface 246 of the arm 240 and pushes the ring 130 in the forward direction).

Figure 10:
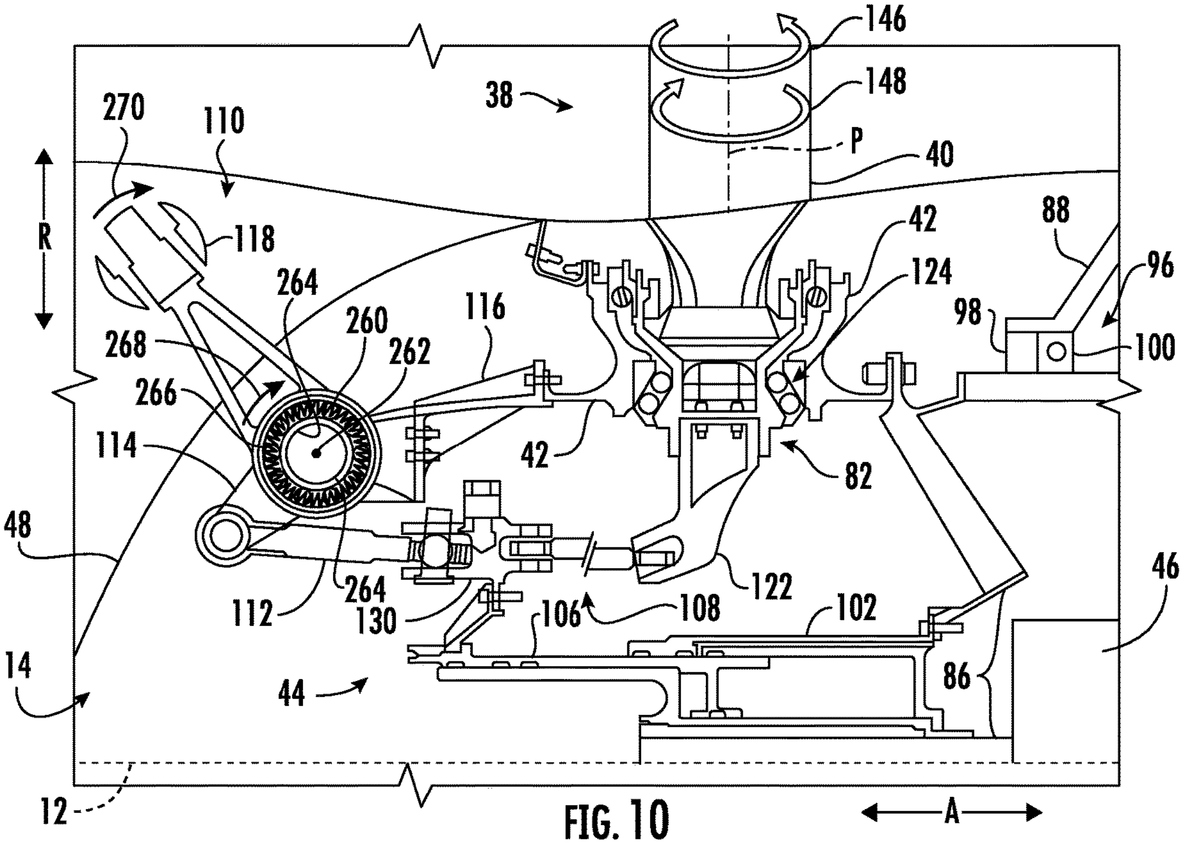
FIG. 10 is a side view of a forward end of an exemplary gas turbine engine depicting another exemplary embodiment of a spring mechanism for a variable pitch fan of a gas turbine engine according to an exemplary aspect the present disclosure.

Referring now to FIG. 10, FIG. 10 is a side view of a forward end of an exemplary gas turbine engine 10 depicting another exemplary embodiment of a spring mechanism 132 for a variable pitch fan 38 according to an exemplary aspect the present disclosure. Gas turbine engine 10 may generally be configured in a similar manner as the gas turbine engine 10 of FIGS. 2 and 3. In such a manner, it will be appreciated that the fan 38 includes a pitch change mechanism 44 and a trunnion 82 having a bearing assembly 124 to enable rotation of fan blade 40 and trunnion 82 relative to disk 42.

In the illustrated embodiment, the spring mechanism 132 includes a torsion spring 260 coupled to a counterweight assembly 110. For example, as described above, a lever arm 114 is pivotally coupled to a hinge 116 to enable pivotal or rotational movement of the lever arm 114 relative to the hinge 116 about a pivot point 262. In this embodiment, the counterweight assembly 110 includes a hub 264 located axially with the pivot point 262 and operably coupled to and/or forming part of the counterweight 118. Spring 260 is wrapped or wound about the hub 264 having one end thereof coupled to the hub 264 and another end thereof coupled to a housing 266 of the counterweight assembly 110 (or other fixed structure relative to the hub 264, such as the hinge 116 and/or disk 42). In this embodiment, spring 260 is a non-linear torsion spring 260 providing a non-linear relationship between the force applied by the spring 260 and the deflection of the spring 260.

In the embodiment illustrated in FIG. 10, the spring 260 applies a force to the counterweight assembly 110 to create a spring twisting moment 268 on the counterweight assembly 110 in the same direction as a counterweight moment 270 such that the counterweight moment 270 and the spring twisting moment 268 are both counter or opposite in direction to the centrifugal twisting moment 146 of the fan blade 40, thereby resulting in the spring twisting moment 148 applied to the trunnion 82 counter or opposite in direction to the centrifugal twisting moment 146 of the fan blade 40. In other words, the combination of the spring twisting moment 268 on the counterweight assembly 110 and the counterweight moment 270 created by the counterweight assembly 110 itself counter the centrifugal twisting moment 146 of the fan blade 40.

Further aspects are provided by the subject matter of the following clauses:

A gas turbine engine comprising: a turbomachine comprising a compressor section, a combustion section, and a turbine section arranged in serial flow order; a fan defining a fan axis and comprising a plurality of fan blades rotatable about the fan axis; a pitch change mechanism operable with the plurality of fan blades to control a pitch of the plurality of fan blades; a counterweight connected to each respective fan blade; and a spring mechanism operably associated with each fan blade of the plurality of fan blades, the spring mechanism of each respective fan blade operable to create a spring twisting moment on the respective fan blade that is counter to a centrifugal twisting moment of the respective fan blade.

The gas turbine engine of the preceding clause, wherein the spring mechanism comprises a non-linear spring.

The gas turbine engine of any preceding clause, wherein the fan comprises a disk, wherein the spring mechanism comprises a spring having a first end coupled to the disk and a second end coupled to a trunnion of a respective fan blade.

The gas turbine engine of any preceding clause, wherein the spring mechanism comprises a torsion spring.

The gas turbine engine of any preceding clause, wherein a trunnion of each respective fan blade includes a cam portion, and wherein the spring mechanism includes a biased follower operatively engageable with the respective cam portion.

The gas turbine engine of any preceding clause, wherein a trunnion of each respective fan blade includes a gear portion, and wherein the spring mechanism includes a biased gear engageable with the respective gear portion.

The gas turbine engine of any preceding clause, wherein the counterweight is rotatable about a hub, and wherein the spring mechanism comprises a torsion spring wound around the hub.

The gas turbine engine of any preceding clause, wherein each fan blade is operably coupled to a disk by a respective trunnion, and wherein the spring mechanism is disposed between the disk and the respective trunnion.

The gas turbine engine of any preceding clause, wherein the spring mechanism comprises an annular gap defined between the disk and the trunnion.

The gas turbine engine of any preceding clause, wherein the spring mechanism comprises a spring disposed within the annular gap.

The gas turbine engine of any preceding clause, wherein a trunnion of each respective fan blade includes a cam portion, and wherein the spring mechanism includes a follower operatively engageable with the respective cam portion, wherein each fan blade is operably coupled to a disk, and wherein the follower is pivotally coupled to the disk.

The gas turbine engine of any preceding clause, wherein the spring mechanism includes an arm having a first end coupled to a disk and a second end located proximate a ring, and wherein the spring mechanism includes a spring coupled to the ring and extending toward the second end of the arm.

The gas turbine engine of any preceding clause, wherein a trunnion of each respective fan blade includes a cam portion, and wherein the spring mechanism includes a plunger operatively engageable with the respective cam portion, and wherein the spring mechanism includes a spring operably biasing the plunger toward the cam portion.

A gas turbine engine comprising: a turbomachine comprising a compressor section, a combustion section, and a turbine section arranged in serial flow order; a fan defining a fan axis and comprising a plurality of fan blades rotatable about the fan axis; a pitch change mechanism operable with the plurality of fan blades to control a pitch of the plurality of fan blades; a counterweight connected to each respective fan blade; and a spring mechanism operably associated with each fan blade of the plurality of fan blades, the spring mechanism operable with the counterweight of a respective fan blade to counter a centrifugal twisting moment of the respective fan blade.

The gas turbine engine of any preceding clause, wherein the spring mechanism comprises a non-linear spring.

The gas turbine engine of any preceding clause, wherein the fan further comprises a disk, wherein the spring mechanism comprises a spring having a first end coupled to the disk and a second end coupled to a trunnion of a respective fan blade.

The gas turbine engine of any preceding clause, wherein the spring mechanism comprises a torsion spring.

The gas turbine engine of any preceding clause, wherein a trunnion of each respective fan blade includes a cam portion, and wherein the spring mechanism comprises a biased follower operatively engageable with the respective cam portion.

The gas turbine engine of any preceding clause, wherein a trunnion of each respective fan blade includes a gear portion, and wherein the spring mechanism comprises a biased gear engageable with the respective gear portion.

The gas turbine engine of any preceding clause, wherein the counterweight is rotatable about a hub, and wherein the spring mechanism comprises a torsion spring wound around the hub.

A gas turbine engine comprising: a turbomachine comprising a compressor section, a combustion section, and a turbine section arranged in serial flow order; a fan defining a fan axis and comprising a plurality of fan blades rotatable about the fan axis; a pitch change mechanism operable with the plurality of fan blades to control a pitch of the plurality of fan blades; and a plurality of spring mechanisms, each spring mechanism of the plurality of spring mechanisms operably associated with a respective fan blade of the plurality of fan blades, each respective spring mechanism creating a spring twisting moment on the respective fan blade to counter a centrifugal twisting moment of the respective fan blade.

The gas turbine engine of any preceding clause, wherein each spring mechanism of the plurality of spring mechanisms comprises a non-linear spring.

The gas turbine engine of any preceding clause, wherein the fan further comprises a disk, wherein each spring mechanism of the plurality of spring mechanisms comprises a spring having a first end coupled to the disk and a second end coupled to a trunnion of a respective fan blade.

The gas turbine engine of any preceding clause, wherein a trunnion of each respective fan blade includes a cam portion, and wherein each spring mechanism of the plurality of spring mechanisms comprises a spring-biased follower operatively engageable with the respective cam portion.

The gas turbine engine of any preceding clause, wherein a trunnion of each respective fan blade includes a gear portion, and wherein each spring mechanism of the plurality of spring mechanisms comprises a spring-biased gear engageable with the respective gear portion.

The gas turbine engine of any preceding clause, wherein a trunnion of each respective fan blade includes a cam portion, and wherein each spring mechanism of the plurality of spring mechanisms comprises a spring compressible by a plunger operatively engageable with the respective cam portion.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:

a turbomachine comprising a compressor section, a combustion section, and a turbine section arranged in serial flow order;

a fan defining a fan axis and comprising a plurality of fan blades rotatable about the fan axis and a disk;

a pitch change mechanism operable with the plurality of fan blades to control a pitch of the plurality of fan blades;

a counterweight connected to each respective fan blade; and a spring mechanism operably associated with each respective fan blade, the spring mechanism of each respective fan blade operable to create a spring twisting moment on the respective fan blade that is counter to a centrifugal twisting moment of the respective fan blade, wherein the spring mechanism comprises a non-linear spring;

wherein each respective fan blade is coupled to a respective trunnion comprising a respective sleeve, wherein the non-linear spring of the spring mechanism is wrapped about the respective sleeve of the respective trunnion, and wherein the non-linear spring comprises a first end directly coupled to the disk and a second end directly coupled to the respective trunnion of each respective fan blade.

2. The gas turbine engine of claim 1, wherein the non-linear spring comprises a torsion spring.

3. The gas turbine engine of claim 1, wherein the respective trunnion of each respective fan blade includes a cam portion, and wherein the spring mechanism includes a biased follower operatively engageable with the respective cam portion.

4. The gas turbine engine of claim 1, wherein the respective trunnion of each respective fan blade includes a gear portion, and wherein the spring mechanism includes a biased gear engageable with the respective gear portion.

5. The gas turbine engine of claim 1, wherein the counterweight is rotatable about a hub, and wherein the non-linear spring comprises a torsion spring wound around the hub.

6. The gas turbine engine of claim 1, wherein:

the spring mechanism defines an annular gap between an inner wall of the disk and the respective sleeve of the respective trunnion; and the non-linear spring of the spring mechanism is disposed within the annular gap.

7. The gas turbine engine of claim 1, wherein the counterweight is operably coupled to the respective trunnion of each respective fan blade.

8. The gas turbine engine of claim 1, further comprising a link arm coupled to the respective trunnion via linkages, a lever arm coupled to and extending between the link arm and the counterweight, wherein the lever arm is configured to transfer movement of the counterweight to the link arm to drive rotation of the respective trunnion relative to the disk.

9. A gas turbine engine comprising:

a turbomachine comprising a compressor section, a combustion section, and a turbine section arranged in serial flow order;

a fan defining a fan axis and comprising a plurality of fan blades rotatable about the fan axis and a disk;

a pitch change mechanism operable with the plurality of fan blades to control a pitch of the plurality of fan blades;

a counterweight connected to each respective fan blade; and a spring mechanism operably associated with each respective fan blade, the spring mechanism operable with the counterweight of each respective fan blade to counter a centrifugal twisting moment of each respective fan blade, wherein the spring mechanism comprises a non-linear spring;

wherein each respective fan blade is coupled to a respective trunnion comprising a respective sleeve, and wherein the non-linear spring of the spring mechanism is wrapped about the respective sleeve of the respective trunnion, and wherein the non-linear spring comprises a first end directly coupled to the disk and a second end directly coupled to the respective trunnion of each respective fan blade.

10. The gas turbine engine of claim 9, wherein the non-linear spring comprises a torsion spring.

11. The gas turbine engine of claim 9, wherein the respective trunnion of each respective fan blade includes a cam portion, and wherein the spring mechanism comprises a biased follower operatively engageable with the respective cam portion.

12. The gas turbine engine of claim 9, wherein the respective trunnion of each respective fan blade includes a gear portion, and wherein the spring mechanism comprises a biased gear engageable with the respective gear portion.

13. The gas turbine engine of claim 9, wherein the counterweight is rotatable about a hub, and wherein the non-linear spring comprises a torsion spring wound around the hub.

14. A gas turbine engine comprising:

a turbomachine comprising a compressor section, a combustion section, and a turbine section arranged in serial flow order;

a fan defining a fan axis and comprising a plurality of fan blades rotatable about the fan axis and a disk;

a pitch change mechanism operable with the plurality of fan blades to control a pitch of the plurality of fan blades; and a plurality of spring mechanisms, each spring mechanism of the plurality of spring mechanisms operably associated with each respective fan blade of the plurality of fan blades, each respective spring mechanism creating a spring twisting moment on the respective fan blade to counter a centrifugal twisting moment of the respective fan blade, wherein each spring mechanism of the plurality of spring mechanisms comprises a non-linear spring;

wherein each respective fan blade is coupled to a respective trunnion comprising a respective sleeve, and wherein the non-linear spring of each spring mechanism of the plurality of spring mechanisms is wrapped about the respective sleeve of the respective trunnion; and wherein the non-linear spring comprises a first end directly coupled to the disk and a second end directly coupled to the respective trunnion of each respective fan blade.

15. The gas turbine engine of claim 14, wherein the respective trunnion of each respective fan blade includes a cam portion, and wherein each spring mechanism of the plurality of spring mechanisms comprises a spring-biased follower operatively engageable with the respective cam portion.

16. The gas turbine engine of claim 14, wherein the respective trunnion of each respective fan blade includes a gear portion, and wherein each spring mechanism of the plurality of spring mechanisms comprises a spring-biased gear engageable with the respective gear portion.

17. The gas turbine engine of claim 14, wherein the respective trunnion of each respective fan blade includes a cam portion, and wherein each spring mechanism of the plurality of spring mechanisms comprises a spring compressible by a plunger operatively engageable with the respective cam portion.

* * * * *